US007735136B2

(12) United States Patent
Mantripragada et al.

(10) Patent No.: US 7,735,136 B2
(45) Date of Patent: Jun. 8, 2010

(54) 0-TOUCH AND 1-TOUCH TECHNIQUES FOR IMPROVING THE AVAILABILITY OF COMPUTER PROGRAMS UNDER PROTECTION WITHOUT COMPROMISING SECURITY

(75) Inventors: Srinivas Mantripragada, Cupertino, CA (US); Tim Garnett, Boston, MA (US); Derek Bruening, Troy, NY (US); Vladimir Kiriansky, Cambridge, MA (US); Bharath Chandramohan, Sunnyvale, CA (US); James Brink, Oakland, CA (US); Saman P. Amarasinghe, Waltham, MA (US); Sandy Wilbourn, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1068 days.

(21) Appl. No.: 11/406,063

(22) Filed: Apr. 18, 2006

(65) Prior Publication Data

US 2006/0288420 A1 Dec. 21, 2006

Related U.S. Application Data

(60) Provisional application No. 60/672,414, filed on Apr. 18, 2005.

(51) Int. Cl.
 *G06F 12/14* (2006.01)
(52) U.S. Cl. .......................................... 726/22; 713/166
(58) Field of Classification Search .................. None
 See application file for complete search history.

(56) References Cited

U.S. PATENT DOCUMENTS 5,193,180 A 3/1993 Hastings
5,974,549 A * 10/1999 Golan ........................ 726/23
6,185,669 B1 2/2001 Hsu
6,189,141 B1 2/2001 Benitez
6,199,202 B1 3/2001 Coutant
6,205,545 B1 3/2001 Shah
6,219,832 B1 4/2001 Buzbee
6,223,339 B1 4/2001 Shah
6,237,065 B1 5/2001 Banerjia et al.

(Continued)

OTHER PUBLICATIONS

Baratloo, et al., "Transparent Run-Time Defense Against Stack Smashing Attacks," Proceedings of the USENIX Annual Technical Conference, Jun. 2000.

(Continued)

*Primary Examiner*—Brandon S Hoffman

(57) ABSTRACT

Protected software, such as an application and/or DLL, is monitored by protective software to guard against attacks, while distinguishing spurious, benign events from attacks. In a 1-touch approach, the protected software is monitored in a testing environment to detect spurious, benign events caused by, e.g., incompatibility or interoperability problems. The spurious events can be remediated in different ways, such as by applying a relaxed security policy. In a production mode, or 0-touch mode, when the protected software is subject to attacks, the corresponding remediation can be applied when the spurious events are again detected. Security events which occur in production mode can also be treated as benign when they occur within a specified time window. The applications and/or DLLs can further be classified according to whether they are known to have bad properties, known to be well-behaved, or unknown. Appropriate treatment is provided based on the classification.

75 Claims, 7 Drawing Sheets

U.S. PATENT DOCUMENTS

| | | |
|---|---|---|
| 6,243,668 B1 | 6/2001 | Le |
| 6,247,172 B1 | 6/2001 | Dunn |
| 6,255,744 B1 | 7/2001 | Shih |
| 6,275,981 B1 | 8/2001 | Buzbee |
| 6,279,081 B1 | 8/2001 | Spencer |
| 6,295,644 B1 | 9/2001 | Hsu |
| 6,301,699 B1 | 10/2001 | Hollander et al. |
| 6,314,560 B1 | 11/2001 | Dunn |
| 6,317,870 B1 | 11/2001 | Mattson, Jr. |
| 6,327,704 B1 | 12/2001 | Mattson, Jr. |
| 6,351,844 B1 | 2/2002 | Bala |
| 6,374,331 B1 | 4/2002 | Janakiraman |
| 6,377,287 B1 | 4/2002 | Hao |
| 6,378,029 B1 | 4/2002 | Venkitakrishnan |
| 6,412,071 B1 | 6/2002 | Hollander et al. |
| 6,418,530 B2 | 7/2002 | Hsu |
| 6,430,675 B1 | 8/2002 | Hsu |
| 6,430,741 B1 | 8/2002 | Mattson, Jr. |
| 6,453,411 B1 | 9/2002 | Hsu |
| 6,470,492 B2 | 10/2002 | Bala et al. |
| 6,792,546 B1 | 9/2004 | Shanklin |
| 6,895,460 B2 | 5/2005 | Desoli |
| 6,907,519 B2 | 6/2005 | Desoli |
| 6,915,513 B2 | 7/2005 | Duesterwald |
| 6,920,550 B2 | 7/2005 | Desoli |
| 6,928,536 B2 | 8/2005 | Duesterwald |
| 6,976,073 B2 | 12/2005 | Desoli |
| 6,993,754 B2 | 1/2006 | Freudenberger |
| 7,032,114 B1 | 4/2006 | Moran |
| 7,043,756 B2 | 5/2006 | Tsafnat |
| 2002/0184618 A1 | 12/2002 | Bala |
| 2003/0033593 A1 | 2/2003 | Duesterwald |
| 2003/0101292 A1 | 5/2003 | Fisher |
| 2003/0101381 A1 | 5/2003 | Mateev |
| 2003/0101439 A1 | 5/2003 | Desoli |
| 2003/0110478 A1 | 6/2003 | Duesterwald |
| 2003/0182653 A1 | 9/2003 | Desoli |
| 2003/0192035 A1 | 10/2003 | Duesterwald |
| 2004/0025165 A1 | 2/2004 | Desoli |
| 2004/0133777 A1* | 7/2004 | Kiriansky et al. ........... 713/166 |
| 2004/0255163 A1 | 12/2004 | Swimmer |
| 2005/0010804 A1 | 1/2005 | Bruening |
| 2006/0075496 A1 | 4/2006 | Carpenter |
| 2006/0098585 A1 | 5/2006 | Singh |

OTHER PUBLICATIONS

Bruening, et al., "Design and Implementation of a Dymanic Optimization Framework for Windows," 4th Workshop on Feedback-Directed and Dymamic Optimization, Austin, Texas, Dec. 1, 2001.

Cowan, et al., "StackGuard: Automatic Adaptive Detection and Prevention of Buffer-Overflow Attacks," In Proc. 7th USENIX Security Symposium, pp. 63-78, San Antonio. Texas, Jan. 1998.

Erlingsson, et al., "SASI Enforcement of Security Policies: A Retrospective", Proc. of the New Security Paradigms Workshop, Ontario, Canada, Sep. 22-24, 1999.

Frantzen, et al., "StackGhost: Hardware Facilitated Stack Protection," In Proc. 10th USENIX Security Symposium, Washington, DC, Aug. 2001.

Ko, et al., "Detecting and Countering System Intrusions Using Software Wrappers," In Proc. 9th USENIX Security Symposium, Denver, Colorado, Aug. 2000.

Schneider, "Enforceable Security Policies," ACM Transactions on Information and System Security, vol. 3, No. 1, pp. 30-50, Feb. 2000.

Scott, et al., "Strata: A Software Dynamic Translation Infrastructure," Workshop on Binary Translation Infrastructure, Sep. 8, 2001.

Wagner, et al., "Intrusion Detection via Static Analysis," In IEEE Symposium on Security and Privacy, 2001.

Cowan, et al., "FormatGuard: AutomaticProtection From printf Format String Vulnerabilities," In Proc. 10th USENIX Security Symposium. 9 pages, Washington, D.C., Aug. 2001.

Bala, et al., "Dynamo: A Transparent Dynamic Optimization System," Proc. of the ACM SIGPLAN Conf., PLDI, Jun. 2000.

Chen, et al., "Mojo: A Dynamic Optimization System," In 3rd ACM Workshop on Feedback-Directed and Dynamic Optimization, Dec. 2000.

Cmelik, et al., "Shade: A Fast Instruction-Set Simulator for Execution Profiling," SIGMETRICS, 1994.

Hastings, et al., "Purify: Fast Detection of Memory Leaks and Access Errors," Proceedings of the Winter USENIX Conference, pp. 125-136, Jan. 1992.

Hollingsworth, et al., "Dynamic Program Instrumentation for Scalable Performance Tools," Scalable High Performance Computing Confernce, Knoxville, May 1994.

Larus, et al, "Rewriting Executable Files to Measure Program Behavior," Software Practice and Experience, vol. 24(2), pp. 197-218, Mar. 25, 1992.

Ung, et al, "Machine-Adaptable Dynamic Binary Translation," Proc. of the ACM SIGPLAN Workshop on Dynamic and Adaptive Compilation and Optimization, Jan. 2000.

Das, "Unification-based Pointer Analysis with Directional Assignments," In Proc ACM SIGPLAN Conf on Programming Language Design and Implementation, Vancouver, BC, Canada, Jun. 2000.

Kiriansky, et al., "Secure Execution Via Program Shepherding," Laboratory for Computer Science, Massachusetts Institute of Technology, Cambridge, MA, 2002.

Schultz, et al., "Data Mining Methods for Detection of new Malicious Executables," In Proc. of the 2001 IEEE Symposium on Security and Privacy, 12 pages, 2001.

* cited by examiner

0-TOUCH AND 1-TOUCH TECHNIQUES FOR IMPROVING THE AVAILABILITY OF COMPUTER PROGRAMS UNDER PROTECTION WITHOUT COMPROMISING SECURITY

CROSS-REFERENCE TO RELATED APPLICATIONS

This application claims the benefit of U.S. provisional patent application No. 60/672,414, filed Apr. 18, 2005, entitled "Techniques To Improve The Availability Of Computer Programs Under Protection Without Compromising Security", and incorporated herein by reference.

BACKGROUND

1. Field of the Invention

The present invention relates to protecting computer software.

2. Description of the Related Art

Computer software is subject to various types of attacks from hackers and others. For example, memory-based attacks are the most common among Internet worms, such as SQL Slammer, Code Red, Blaster, Sasser and so forth. Memory-based attacks take advantage of software flaws in order to take control of those programs. The most prevalent ones include buffer overruns, stack overflows, heap overflows, format string vulnerabilities, code-injection and code re-use attacks. Other, non-memory based attacks include denial of service, privilege escalation and control flow/hijack based attacks. As a result, various protective schemes have been developed which attempt to place a protective shield around computer programs, such as by enforcing coding conventions. However, some benign programs with bad properties that break commonly followed coding conventions can be falsely detected as attacks, e.g., false positives, and otherwise interfere with the protective scheme. As a result, the normal execution of the protected program can be interrupted, thereby impairing system availability. A key challenge is to identify benign programs with bad properties, and allow them to run without interruption, while stopping any malicious code from being executed.

SUMMARY

The technology herein, roughly described, provides techniques for improving the protection of programs by distinguishing benign programs from true security events.

In one embodiment, a computer-implemented method for protecting software includes monitoring protected software in a testing environment in which the protected software is insulated from attacks, and, responsive to the monitoring in the testing environment, detecting at least one security event caused by the protected software while in the testing environment. The method further includes providing a remediation for the at least one security event, and maintaining information indicating an association between the at least one security event and the remediation.

Another embodiment of a computer-implemented method for protecting software includes monitoring protected software, responsive to the monitoring, detecting at least one security event caused by the protected software, and, responsive to the detecting, accessing information which associates the at least one security event with a remediation, and implementing the remediation for the at least one security event.

Another embodiment of a computer-implemented method for protecting software includes monitoring protected software, responsive to the monitoring, detecting at least one security event caused by the protected software, and, responsive to the detecting, determining whether the at least one security event is a learned event or an unlearned event. If the at least one security event is determined to be a learned event, the method further includes allowing the protected software to continue running. If the at least one security event is determined to be an unlearned event, and protective software associated with the protected software is in an active state, the method further includes killing at least one thread of the protected software which caused the at least one security event.

Another embodiment of a computer-implemented method for protecting software includes monitoring protected software, responsive to the monitoring, detecting at least one security event caused by the protected software, and, responsive to the detecting, classifying the at least one security event as a spurious event or an attack.

Another embodiment of a computer-implemented method for protecting software includes monitoring protected software, and, responsive to the monitoring, detecting at least one new application and/or DLL in the protected software. The method further includes, responsive to the detecting, determining whether the at least one new application and/or DLL has been classified as: (a) an entity which is known to be well-behaved, or (b) an entity which is known to possess bad properties. Otherwise, the at least one new application and/or DLL is classified as an unknown entity.

Another embodiment of a computer-implemented method for protecting software includes monitoring protected software, responsive to the monitoring, detecting at least one security event caused by the protected software, determining whether the at least one security event occurs within a defined time window, and treating the at least one security event as a benign event if the at least one security event occurs within the defined time window.

Another embodiment of a computer-implemented method for protecting software includes, upon detecting a first instantiation of at least one process of protected software, accessing a flag to determine whether injecting protective software into the at least one process is allowed. If the flag indicates that the injecting is allowed, the method further includes injecting the protective software into the first instantiation of the at least one process, and setting the flag to indicate that injecting the protective software into a subsequent instantiation of the at least one process of the protected software is not allowed.

One or more processor readable storage devices having processor readable code embodied thereon for programming one or more processors to perform the above-mentioned methods can also be provided.

A computer implemented system including at least one processor programmed to perform the above-mentioned methods can also be provided.

DETAILED DESCRIPTION

1. Introduction

Figure 1:
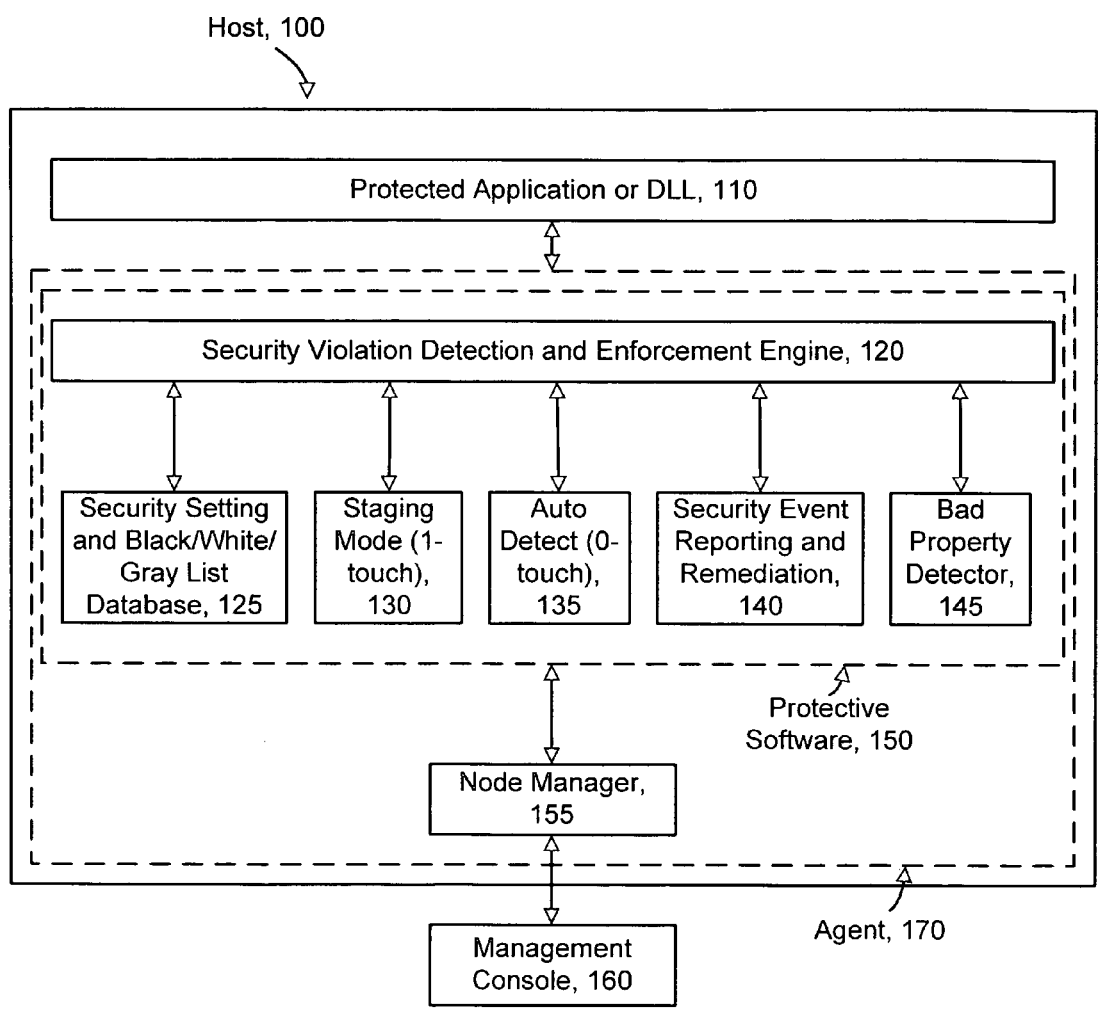
FIG. 1 depicts an architecture for protecting software.

FIG. 1 depicts an architecture for protecting software. The architecture includes a host computer 100, such as an application server, and a management console 160, which communicates with a node manager 155 of the host computer. In practice, the management console 160 may communicate with a number of hosts and their node managers. The management console 160 includes a user interface which allows the user to monitor the host, and to provide commands for configuring protective software 150 in the host. In particular, the protective software 150 and the node manager 155 can be provided by an agent 170 on the host. Generally, the protective software protects one or more applications, e.g., processes, and/or DLLs 110 running on the host. The protective software includes a number of components or modules, including a security violation detection and enforcement engine 120 which detects when security violations occur in the protected application or DLL, and takes appropriate enforcement action.

A security setting and black/white/gray list database 125 stores information for classifying the protected application or DLL. A staging mode function 130, referred to as a 1-touch mode function because it requires a one-time user involvement, allows detection of spurious events, e.g., benign security events, in the protected application or DLL, while in a controlled laboratory environment, e.g., a testing or pre-production environment, in which the protected application or DLL is not subject to attacks or is at least insulated from attacks. The staging mode can be used to qualify an application or DLL before putting it into production. Another alternative is for applications and DLLs to be qualified beforehand, after extensive analysis, and put in the production without the need for the staging mode. The staging mode is a setup mode that guides the user through the necessary steps for putting an application or DLL into production. A security event which occurs in the staging mode can be treated as a benign event. The user may provide explicit instructions for the staging mode via a user interface on the management console 160, for instance, via menus, pop up questions and the like. The staging mode advantageously does not require the user to be involved on multiple occasions. Once the staging mode is completed, the protected application or DLL can be run in a production mode without further user input.

An auto detect function 135, referred to as a 0-touch function because it does not require user involvement, also allows detection of spurious events, such as in a production environment in which the protected application or DLL is subject to attacks. A security event which occurs in the 0-touch mode may be a real attack, and needs to be analyzed further. A security event reporting and remediation function 140 provides reporting and remediation of security events. A bad properties detector 145 detects bad properties exhibited by benign programs that often lead to spurious violations or interfere with the protective software runtime. The functionality provided is discussed in further detail below.

Protective schemes for computer software attempt to place a protective shield around computer programs such as by enforcing coding conventions. One example of a protective scheme is provided by the Vulnerability Protection Suite (VPS), Determina Corp. Redwood City, Calif. The VPS includes a Memory Firewall™ (MF), which provides proactive protection against memory-based attacks, and a LiveShield™ (LS), which provides reactive protection against non memory-based attacks. The VPS protects a computer program by injecting a dynamically-linked library (DLL) into it and managing its execution. By operating within the runtime context of the program, VPS gains full visibility into the program execution and is able to detect and thwart memory-based attacks. The MF approach relies on enforcing a set of coding conventions, called the Application Binary Interface (ABI) that most programs adhere to in order to run properly. However, experience in the field has shown that some benign programs break these conventions and/or interfere with the VPS functionality. Provided herein are techniques for precisely differentiating between benign program and true security events, without affecting the availability of the running program and incurring only minimal additional administrative costs. The techniques can be used at runtime, and with no prior knowledge, for distinguishing between programs that violate the ABI and result in spurious events and true security events caused by malicious activity.

The techniques provided herein are suitable for use in various run-time program execution systems, one example of which is provided in U.S. patent application publication no. 2005/0010804, published Jan. 13, 2005, titled "Secure Execution Of A Computer Program Using A Code Cache", incorporated herein by reference.

There are some intrusive applications with system-wide impact, such as virus detectors or anti-malware products that inject DLLs (or code) to perform various operations within other applications. In some cases the injection leads to interference events that prevent the protective software from protecting the application. For customers with widespread server deployments, it is important to ensure that the protected applications do not become unavailable, since this has a severe impact on normal business activity. The proposed techniques also address this issue.

The bad properties detected from benign programs broadly fall into two major categories, namely incompatibility and poor interoperability:

2.1 Bad Properties Due to Incompatibility

A spurious event can manifest itself due to a self-inflicted problem noticed on an application in the process of securing it with protective software. The protective software can protect an application by enforcing a fundamental set of rules obeyed by most applications called the ABI. However, there are a few applications that violate some of these rules, leading to multiple spurious events. Most of these bad properties are fairly localized, small in number and can be traced to, for example, a new piece of code detected in an existing DLL, a new DLL, or a new application. The spurious events mainly manifest as security alerts within the protective software framework. This can lead to the protective software taking constant remediation action, drastically curtailing or stopping the normal operation of the program. It has been noted that, if an application does not follow the ABI rules, these problems usually show up immediately, typically right after an application is run for the first time under the protective software, or when a previously unseen DLL with an ABI violation is loaded into a protected application. Furthermore, these actions can usually be traced to the misbehaving DLL or application module. Examples of bad properties due to incompatibilities can include:

a) Misuse of a return instruction to do an indirect control transfer;
b) Code trampolines present in stack-to-patch jump tables at runtime; and
c) Certain patterns of dynamically generated code that go undetected and raise violations.

2.2 Bad Properties Due to Poor Interoperability

An interoperability or interference event can manifest itself due to problems inflicted on known applications or DLLs as a result of actions by other intrusive applications that attempt to monitor and control the execution of a protected application. Many security products, such as Anti-Virus, Anti-Spyware, and DefenseWall HIPS or Host Intrusion Prevention System (Softsphere Technologies) as well as many traditional enterprise applications such as Citrix, ADinsight, HyperWave, Content Management software, and so forth, fit into this class. These applications typically inject a DLL into a protected application, and may modify or insert trampolines in the application, potentially leading to conflicts. These types of behaviors have widespread repercussions, typically causing failures on a large number of processes on a given machine. In most cases, the action directly interferes with the operations of protective software, by causing an interference event, and indicates an attack. Sometimes, these actions are benign and are simply performing a task that violates the ABI, which the protective software considers to be a security violation. Such benign actions are considers to be spurious events. In other cases, the interference events can have undesirable effects leading to functionality loss or an ungraceful application crash. These problems are much harder to deal with, since the module at which the event occurs is not always the source behind the event. Furthermore, these activities do not happen immediately upon an application being put under protection by the protective software, but occur when the interfering software is launched. Typically, they occur immediately after the foreign DLL is inserted into the protected application.

Examples of bad properties due to interoperability can include:

a) Hook address conflicts with the protective software;
b) Remote shell-code (or DLL) insertion into every process; the shell-code or DLL contains bad properties that the protective software does not like; and
c) Modification of code page permissions and contents of currently running processes. Modern operating systems divide computer memory into smaller partitions, and allocate memory using a page as the smallest building block. A page containing code is referred to as a code page.

3. Empirical Data

While typically protective software can be used without problems with a wide variety of computer programs, ranging from server applications, desktop programs and third-party software, a few well-known applications exhibit properties that can interfere with the actions of the protective software or violate the ABI rules, compelling the protective software to take remediation action. The impact of the bad properties is observed on three different occasions:

a) during process launch, either when some applications are starting with the protective software for the first time, e.g., during boot-time, or another intrusive application is starting for the first time;
b) when a new application is put under the protection of the protective software; and
c) when a new DLL is detected in an application under the protective software.

It is also observed that most security violations happen fairly quickly, e.g., less than about one minute, from the point when new code has been loaded to the point when the violation is detected. This observation helps define some of the ideas behind the techniques proposed in subsequent sections. The new code path detected can either be a new application that has not been qualified before, or a new DLL within a qualified application, for instance. An application is qualified if it has met an internal quality assurance (QA) process and is certified to cause no security violations.

4. Terminology

The following terminology is provided for convenience.

a) Management Console (MC): A central management interface, installed on one server/host, to administer agents.
b) Agent: Includes a Node Manager and protective software. Protects designated applications and services on the server from attack. Installed on each server that is protected.
c) Node Manager: Provides a communication channel between the management console and the protective software. Controls the operation of the protective software. Aggregates all results/events posted by the protective software.
d) Dynamically Generated Code (DGC): Code that is created and/or modified by a process at runtime.
e) Dynamically Linked Library (DLL): A library that is linked, loaded and executed by an application at runtime.
f) Spurious event: A false positive event within the protective software environment.
g) Interference event: An event that interferes with the protective software, and that can lead to reduced security or an application crash.
h) Heap violations: An event generated by the protective software indicating an abnormal property detected, with the offending target location present on the heap, e.g., a block of memory used by the protective software.
i) Stack violations: An event generated by the protective software indicating an abnormal property detected, with the offending target location present on the stack, e.g., an area in memory that stores temporary register information, parameters, and return addresses of subroutines for the protective software.
j) Restricted Control Transfer (RCT) violations: An event generated by the protective software indicating an Application Binary Interface (ABI) violation. For example, a return-after-call violation indicates that a return from the called procedure did not jump to the next instruction following the call.
k) RWX: The properties of the page, e.g., Read (R), Write (W) or (X) execute.
l) Import Address Table (IAT): Every Microsoft Windows® application has an IAT residing inside the program. The IAT is used as a lookup table when the application is calling a function that is not originally part of the application (hence imported). Before an application starts, it builds the IAT table by finding the addresses of the functions it wants to call.

5. Protection Modes and State Dependencies

Figure 2:
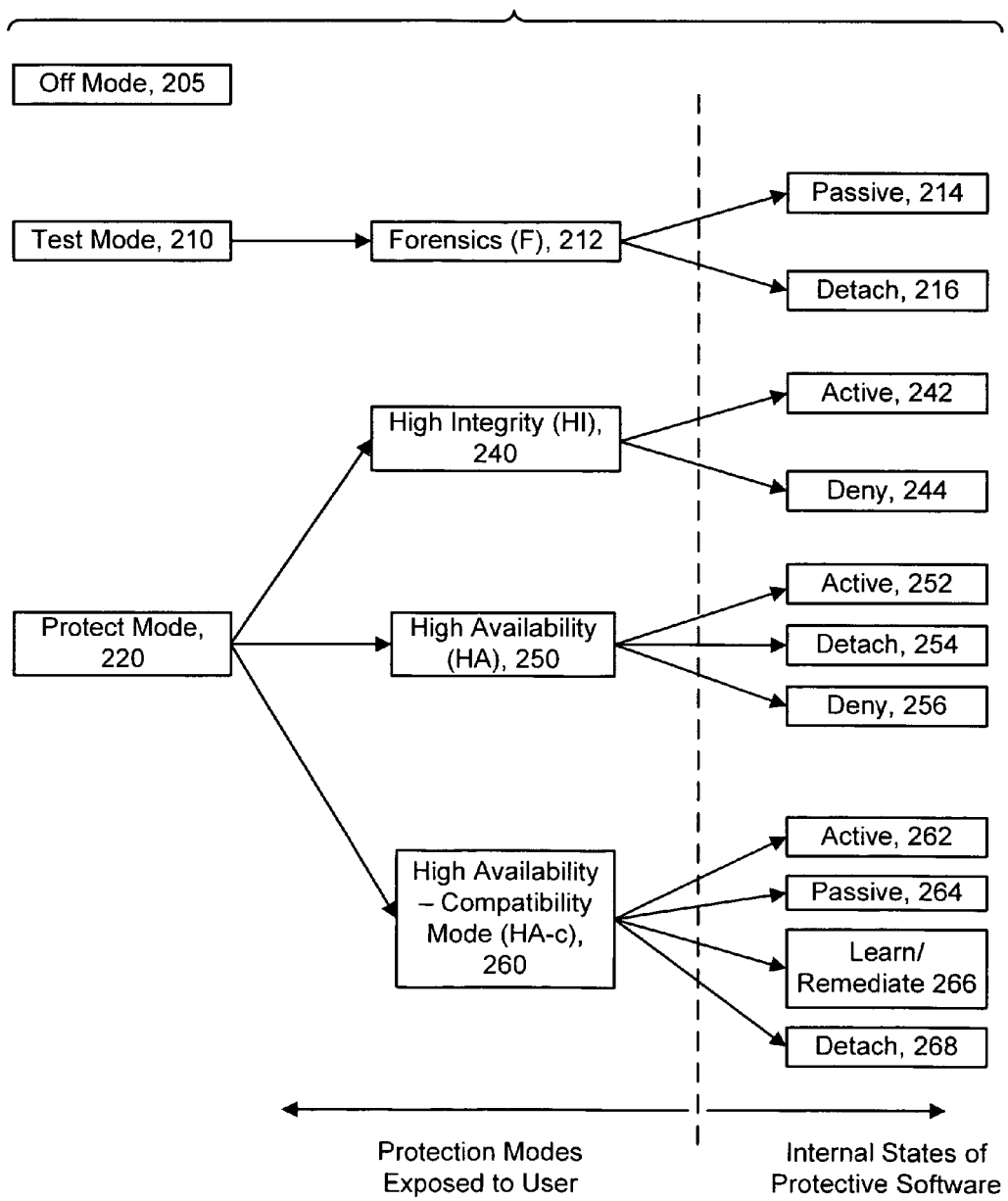
FIG. 2 depicts relationships between externally visible protection modes and internal states of protective software.

FIG. 2 depicts relationships between externally visible protection modes and internal states of protective software. The protective software can operate in different internal program states. For example, in one approach, the protective software can be in one of five possible states at any given point in time: (1) Active, (2) Passive, (3) Detach, (4) Deny, and (5) Learn/

Remediate. Moreover, FIG. 7 and FIG. 9, discussed further below, show the different states for 0-touch and 1-touch modes, respectively.

Further, various externally visible protection modes can be exposed to the user, including an off mode 205, a test mode 210, which includes a Forensics mode 212, and a protect mode 220, which includes a High Integrity mode 240, a High Availability mode 250, and a High Availability-Compatibility (HA-c) mode 260. HA-c is a mode used for 0-touch detection/remediation. The Forensics mode 212 is used for both the 0-touch and 1-touch modes. The protect mode 220 refers to the active state, and can apply in both 1-touch and 0-touch modes. The 1-touch mode can include a staging mode operation as a prerequisite before the protected application is put in a production/active state, whereas the 0-touch mode can be put directly into production.

The different internal program states include:
(1) Active state. In this state, the protective software runs in full protect mode.
(2) Passive state. In this state, the protective software runs in non-protect mode, passively recording all events.
(3) Detach state. In this state, the protective software stops protecting the application or DLL and lets it run native. The detach process itself is transparent to the underlying application and, once detached, it cannot return to the active or passive state.
(4) Deny state. In this state, the application is denied from running by the protective software. This can involve killing a thread, for example. An error message is displayed to the user warning of the presence of the malicious program.
(5) Learn/Remediate state. In this state, the protective software learns a GrayList and allows remediation, e.g., security relaxation, as discussed further below under the section titled "0-touch Detection of Spurious Events".

In the Forensics (F) mode 212, the passive state 214 and detach state 216 can exist. In the High Integrity mode 240, the active state 242 and the deny state 244 can exist. In the High Availability mode 250, the active state 252, detach state 254 and deny state 256 can exist. In the High Availability—Compatibility mode 260, the active state 262, passive state 264, Learn/Remediate state 266 and detach state 268 can exist.

Figure 3:
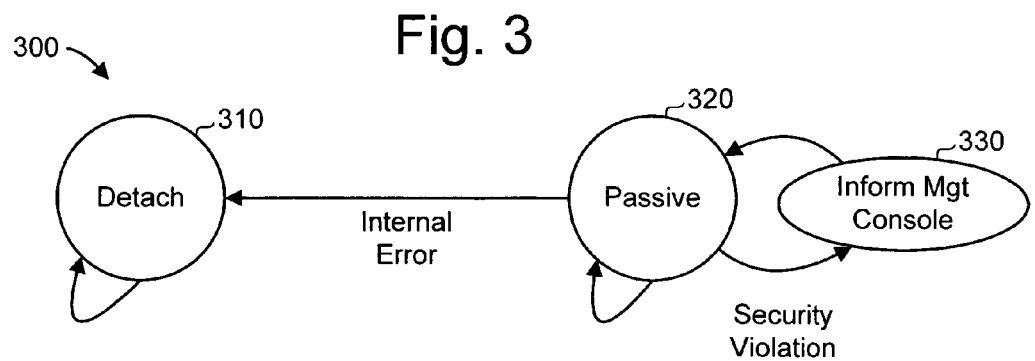
FIG. 3 depicts a state diagram of a Forensics (F) mode of protective software.
Figure 4:
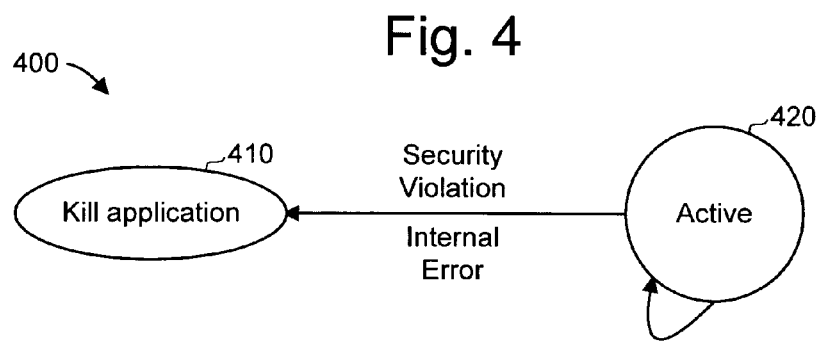
FIG. 4 depicts a state diagram of a High-Integrity (HI) mode of protective software.
Figure 5:
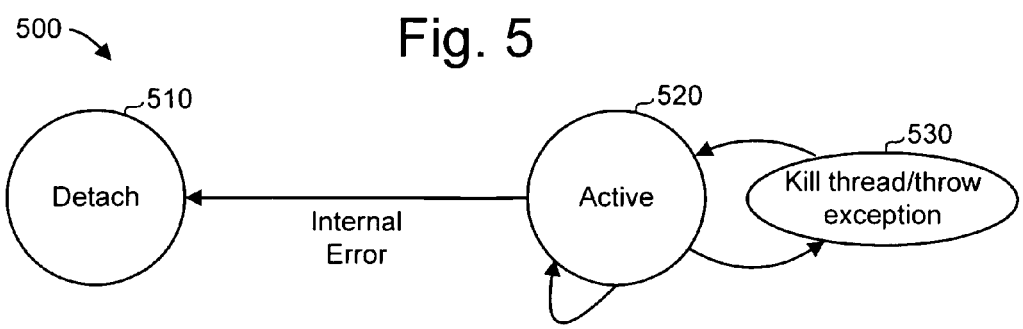
FIG. 5 depicts a state diagram of a High Availability (HA) mode of protective software.

FIGS. 3-5 provide state diagrams showing transitions between the various internal program states for the different externally visible protection modes. States are shown by circles and operations are shown by ovals.

FIG. 3 depicts a state diagram of a Forensics (F) mode of protective software. The mode is represented by a state diagram 300 which includes the detach state 310, the passive state 320 and an inform management (mgt) console operation 330. In this mode, the protective software runs passively in the passive state 320, logging all events. If a security violation is detected, the protective software informs the management console, at operation 330. The management console can be notified of both real and spurious security events. The events themselves can have different annotational properties so that the management console can decide on further processing, e.g. reporting, update database, etc. If an internal protective software error is detected, the protective software detaches itself from the protected application by transitioning from the passive state 320 to the detach state 310.

FIG. 4 depicts a state diagram of a High-Integrity (HI) mode of protective software. The mode is represented by a state diagram 400 which includes a kill application operation 410 and the active state 420. In this mode, the protective software protects the application at all costs. If a security violation or an internal protective software error is detected, the protected application or DLL which generated the violation is killed when the protective software transitions from the active state 420 to the kill application operation 410. Note that there is a difference between the kill application operation 410 and the deny state. In the deny state, a process is never allowed to execute under protection. On the other hand, the kill application operation can be a temporary behavior such that the affected process can be put back in full protection after necessary workarounds have been explored.

FIG. 5 depicts a state diagram of a High Availability (HA) mode of protective software. In this mode, the protective software stops any attacks, protecting the protected software at all costs. The mode is represented by a state diagram 500 which includes the detach state 510, the active state 520, and a kill thread/throw exception operation 530. In the event of an internal protective software error, a process in the protective software transitions from the active state 520 to the detach state 510. If a security violation is detected, the thread in the protected application or DLL which generated the violation is killed and an exception is thrown at operation 530. In this mode, the protective software will try to keep the application running to the extent possible, e.g., by allowing other existing threads to continue to run. In particular, a distinction can be made between killing an entire application (e.g., all running threads) and killing a part of an application (e.g., one thread). When killing one thread, for example, the application can still continue to be available even after killing the offending thread. However, no threads are available after killing the application as a whole.

6. Different Shades of Security

An application or DLL can be classified according to whether it has a known history for causing or not causing spurious events, or whether it has no known history for causing or not causing spurious events. This can be done at different times. For example, an application or DLL can be classified after extensive analysis before running the application or DLL in the staging and/or production modes. The classification can also be performed during the staging mode and/or during the production mode, when the application or DLL is first seen by the protective software, such as when the application or DLL is first loaded.

Figure 6:
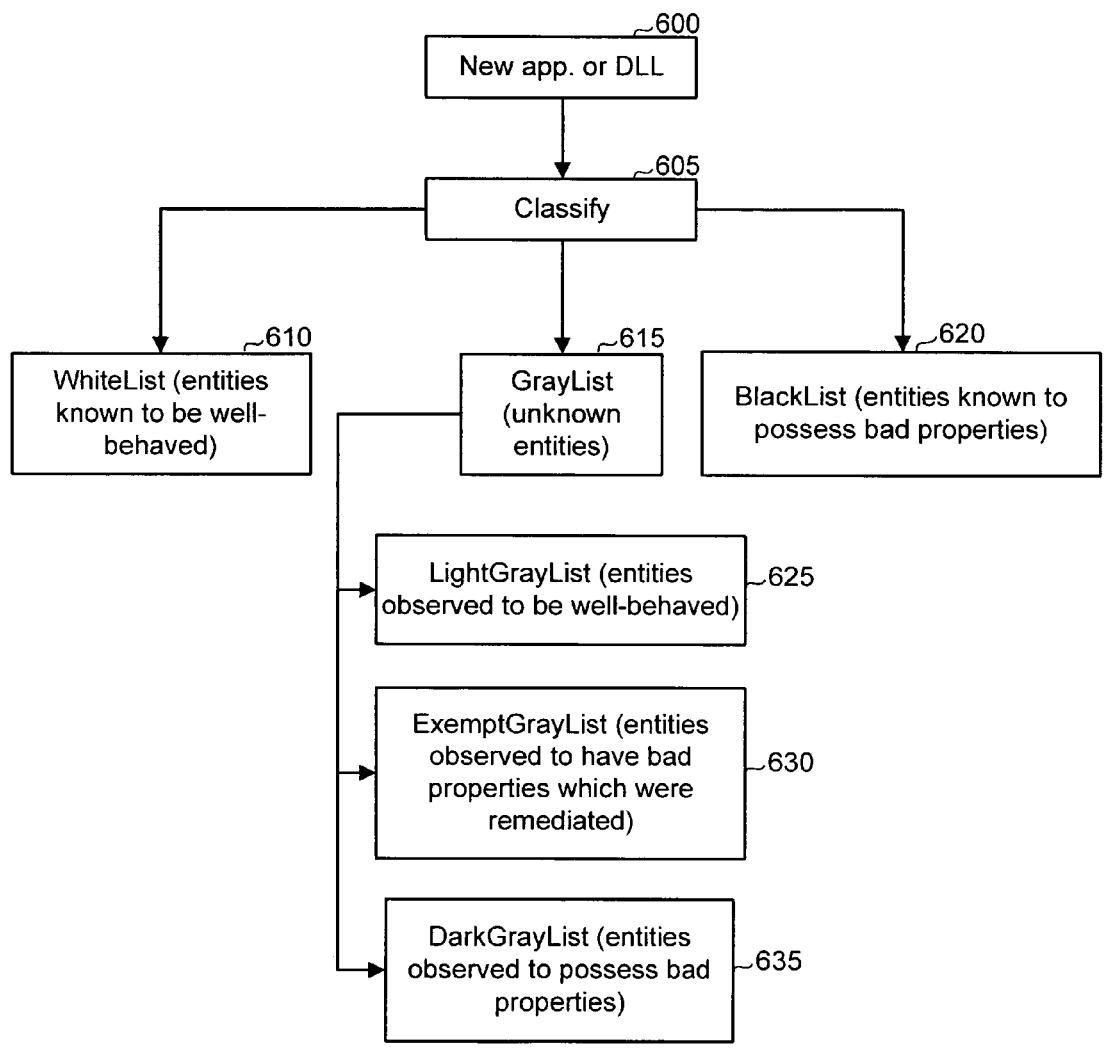
FIG. 6 depicts classification of an application or DLL.

FIG. 6 depicts classification of an application or DLL. Three classes (or shades) of security that can be applied to a new entity, such as an application or DLL 600, can be defined, including:
a) WhiteList (610): An internally qualified set comprising well-behaved entities. These entities have no problem running with full protection under the protective software, and form the base factory-installed "good" set. That is, the application or DLL has a known history for not causing spurious events. The "action" attribute associated with WhiteList entities is default ALLOW.
b) BlackList (620): An internally qualified set comprising entities known to possess bad properties. These entities have indicated problems when running under the protective software which cannot be remediated. That is, the application or DLL has a known history for causing spurious events. This set forms the base factory-installed "bad" set. The "action" attribute associated with BlackList entities is either DENY or DETACH, depending on the nature of the bad property.
c) GrayList (615): An entity that is neither in the WhiteList or BlackList. There is no prior information regarding the properties of entities from this set.

The applications and DLLs on the WhiteList and the BackList can be maintained in a database of application or DLL names, caches and the like, so that the list is available when the protective software begins running. The WhiteList and the BackList can be factory installed into the protective software, and updated from time to time as new applications and DLLs become available. Names of the applications and DLLs which are added to one of the GrayLists can be added to the database as they are classified when the protective software is running. The GrayList entities are further sub-classified into three categories to capture the protective software state transitions more precisely.

c1) ExemptGrayList (630): This GrayList set comprises entities shown to possess certain bad properties that the protective software concluded were benign, and then reliably remediated by making safe security relaxations to work around the bad property.

c2) LightGrayList (625): This GrayList set comprises entities present in the system for a while with no problems detected so far by the protective software. For all practical purposes, the properties are identical to those of the WhiteList, except that the entities are not factory-installed.

c3) DarkGrayList (635): The properties of this set are identical to those of the BlackList, except that the protective software is responsible for putting the entity in this list.

An entity can belong to only one set at any given point in time. The protective software is responsible for maintaining the accuracy of the sets, e.g., persistency between process restarts, updates at periodic intervals, etc. Note that entities on the WhiteList, DarkGrayList and BlackList will always stay there. However, entities on the LightGrayList can transition to the ExemptGrayList.

7. Precise Detection of Spurious Events

During normal operations of the protective software, any security event detected is assumed to be a true attack event and, as a result, an appropriate alerting and remediation action is taken. In reality, however, spurious events caused by benign programs containing bad properties sometimes do happen, thereby necessitating a mechanism to precisely identify them. To address this issue, one proposal attempts to reliably detect, without any human intervention, a small window where most spurious events usually occur. This is referred to as a 0-touch mechanism because there is no human intervention required. Another proposal, involving the staging mode, provides a 1-touch mechanism which allows a human to test for various incompatibility and interoperability problems, if any, in a laboratory environment where it is guaranteed that no attacks can originate.

7.1 0-touch Detection of Spurious Events

Figure 7:
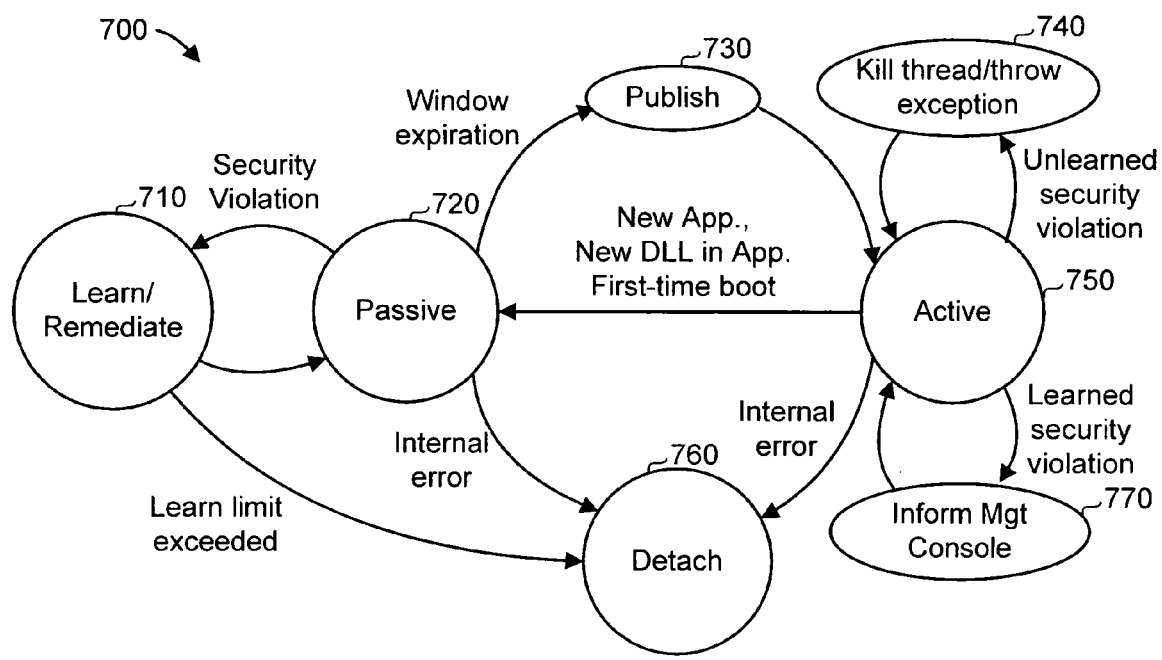
FIG. 7 depicts a state diagram of a High Availability—Compatibility (MA-c) mode of protective software for 0-touch detection of spurious events.

FIG. 7 depicts a state diagram of a High Availability—Compatibility (HA-c) mode of protective software for 0-touch detection of spurious events. In this mode, there are four states possible: (1) Active, (2) Passive, (3) Detach and (4) Learn/Remediate (learn gray list/allow remediation). The mode is represented by a state diagram 700 which includes the learn/remediate state 710, the passive state 720, a publish operation 730, a kill thread/throw exception operation 740, the active state 750, the detach state 760 and an inform management console operation 770. The transition from the active state 750 to the detach state 760 is similar to that in the HA mode, occurring in the event of an internal protective software error. A similar transition can be made from the passive state 720 to the detach state 760.

The protective software can also transition from the active state 750 to the passive state 720. Some conditions under which this transition can occur include:

a) "New App detected": When an application (or process) is seen for the first time.

b) "New DLL in an APP": When an application (APP) invokes a new DLL that is not part of WhiteList DLLs.

c) "First-time boot" or "First-time protective software running": During boot or installation time.

In the learn/remediate state 710, the protective software records and learns all spurious events detected. The classes of bad properties that trigger spurious events in this phase are described in the next section.

In the active state 750, if an "unlearned security violation" is detected, the thread in the protected application or DLL which generated the violation is killed and an exception is thrown, at operation 740. However, if a "learned security violation" is detected, the protective software informs the management console at operation 770, but otherwise ignores the event and continues its normal operation. All the events generated in the HA-c mode are treated specially. That is, the events generated from this phase are treated differently than the other events, as discussed further below. An unlearned security violation is a security violation that has not previously been recognized and classified by the protective software. Accordingly, such security violations are treated as real security events which are handled by killing the thread which generated the event and throwing an exception. On the other hand, a learned security event has previously been recognized and classified by the protective software, e.g., using the black or white classifications of FIG. 6, so it is only necessary to report the violation to the management console. To this end, records of learned and unlearned security events can be maintained and accessed as needed.

In the learn/remediate state 710, the protective software aggressively learns all new entities detected, e.g., those which have not been learned previously, and updates the corresponding GrayList classifications to include the new entities. Moreover, remediation can be performed by relaxing the minimal security policies of the protective software to allow the protected application to run gracefully.

The protective software can switch back from the passive state 720 to the active state 750 using one or more of the window expiration conditions listed below:

a) A predefined wall clock time window such as one minute.

b) A predefined amount of CPU time used by the application.

c) A predefined code coverage metric such as when 10% of the code in the new application or the inserted DLL is executed.

d) A predefined number of event measurements such as a certain number of system calls were issued by either the entire system or the new component that triggered the detection.

e) The system reaches a stable state after boot up if the application/DLL was first detected at boot time.

For example, an algorithm using the wall clock time window can be provided as follows:

(1) Track the TIME START when a new App (or DLL) is loaded.

(2) Track the TIME END if the new App (or DLL) triggers a security violation.

(3) If the TIME INTERVAL between TIME START and TIME END is under a well defined TIME THRESHOLD (e.g., one minute).

Apply the dynamic relaxation in security policy (see section 9 for specific policies)

ELSE

Flag an Attack

If the RATE of distinct security violations detected after above steps (1)-(3) still exceed a THRESHOLD Detach the Application from the protective software.

Still referring to FIG. 7, the transition from the passive state 720 to the active state 750, upon expiration of the window, involves a publish operation 730, which can include two flavors:

a) Global publish—In this mode, all the information learned can be broadcasted to other nodes, e.g., hosts, in the network. This information includes all new entities and their types, e.g., the GrayList classifications of the new applications or DLLs. This mode requires security admin privileges.

b) Local publish—In this mode, the information learned can only be broadcast locally, within a node, so that a new process can benefit from the information learned from a similar process previously, e.g., opening ten instances of a web browser.

Additionally, the learn/remediate state 710 can transition to the detach state 760 if a learn limit is exceeded. For example, a learn limit may be provided by implementation restrictions. That is, due to space limitations, there may be a limit enforced on the number of new DLLs that can be learned per process. The threshold value can be determined through experimentation.

Classification

Since a security event detected by the system may be a spurious event, a methodology is needed to differentiate between actual attacks and spurious events due to an incompatibility or interoperability problem. This classification is critical because, if a spurious event is classified as an actual attack event, the system will generate a false positive. But, even more importantly, if a real attack is classified as a spurious event and ignored, a false negative, it can lead to a system compromise. Thus, discarding an attack event as spurious has to be done after a very through examination.

Phase-based Classification

Various forms of injection, such as system-wide hooking can be problematic. A key challenge is to precisely distinguish between a benign and malicious injection in an automatic way and provide enough information to the admin to take the necessary preventive measures. System-wide hooking can manifest itself in many forms. The proposed steps involve a close cooperation and correlation of events gathered from four distinct phases independently:

a) Inject phase
b) Load phase
c) Hook phase
d) Exception phase

Inject Phase—In this phase, the protective software checks to see if any new DLL is injected into the protected software. Some common methods of injecting DLLs are mentioned further below. This can involve a close monitoring of the below-mentioned API calls and DLL usage.

i) Writing to AppInit_DLLs registry.
ii) Use of SetWindowsHookEx( ) API to hook the DLL into each of its client processes.
iii) Use of CreateRemoteThread( ) API from remote processes.
iv) Implanting custom code using Microsoft® Browser Helper Objects (BHO) plug-ins.
v) Implanting custom code using Microsoft Office® plug-ins.

Load Phase—In this phase, the protective software guarantees that the DLL being loaded is not a BlackList DLL.

Hook Phase—In this phase, the protective software identifies hook attempts of any sort. Two common broad types of hooking functions that the protective software cares about include:

i) IAT Hooking
ii) Entry point trampolines.

Exception phase—This phase detects any suspect security violation. For simplicity and modularity, the exceptions can be categorized into major handles or groups, including:

a) Stack Violations (.A)
b) Heap Violations (.B)
c) RCT Violations (.C)
d) Text Violations (.T)
e) Data Violations (.D)

7.1.1 Learning Component

As mentioned, the learn/remediate state 710 is one of the states of the High Availability—Compatibility (HA-c) mode of the protective software for 0-touch detection of spurious events. The learn/remediate state 710 includes a learning component and a remediation component. When the protective software generates an unknown DLL load event, it adds the DLL to the LightGrayList after a suitable period of time, if it is not already on the WhiteList or ExemptGrayList. When a spurious event gets generated by the unknown DLL, the specified DLL is removed from the LightGrayList (if on it) and added to the ExemptGrayList (these are locked operations). Any spurious events detected during the passive state 720 are recorded, properties are ascertained to be safe and appropriate remediation is performed to continue availability of the running process. The nature of the remediation can range from narrow, to minimize the security hole, to broad, to minimize the risk of further similar violations after the window closes. All spurious events, along with their relationships to affected entities, are recorded in this phase for future suppression of a similar activity.

All new entities recorded in the passive state 720 and ascertained to contain no bad properties are then pushed to the management console using the publish operation 730. The management console is responsible for disseminating the new information and updating its internal database. The new learned information can be pushed to the protective software periodically at user-defined time intervals. For all practical purposes, the protective software treats WhiteList and LightGrayList similarly, except that the former is factory-installed while the latter are generated from this scheme by the protective software.

7.2 One-touch Detection of Spurious Events (Staging Mode)

The staging mode is a customer visible configuration of the protective software. During the staging mode, the protective software assumes that the customer is guaranteeing that no real attacks will occur. This mode is typically set by a security administrator when testing a new system or application within a controlled laboratory environment, where the system either is not connected to the outside or is carefully monitored by other tools. The protected application or DLL is essentially insulated from attacks in this environment. When security violations are detected by the protective software, it can be concluded that they are benign. A remediation can then be applied to the security violations by a remediation engine (FIG. 1).

Figure 8:
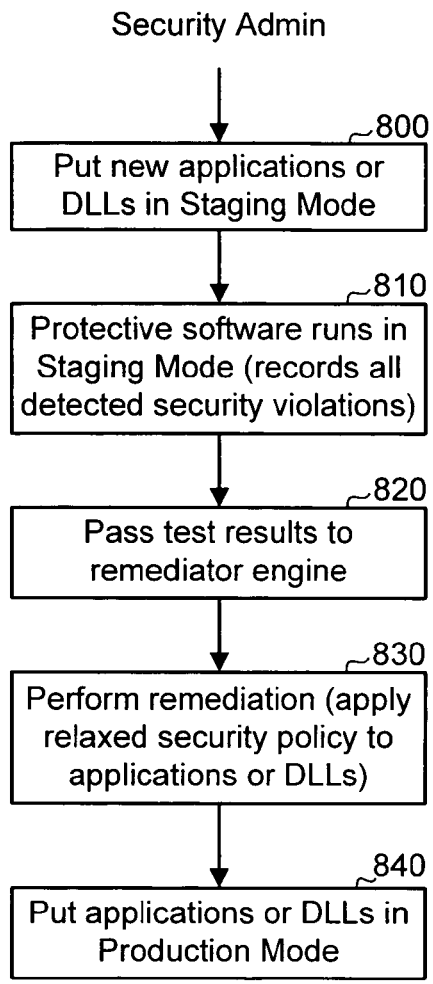
FIG. 8 depicts a staging mode process for protective software.
Figure 9:
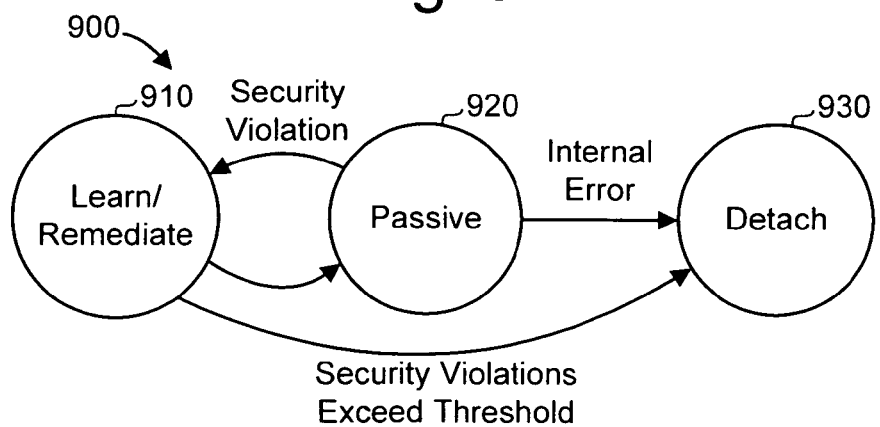
FIG. 9 depicts a state diagram of a staging mode.

FIG. 8 describes the steps incurred during the staging mode process, while FIG. 9 depicts a related state diagram 900 of the staging mode. The staging mode is a 1-touch technique which security administrators use in a controlled/laboratory environment where the possibility of an real attack is low. The security administrator deploys the new applications or DLLs in the staging mode, at step 800. At step 810, the protective software is in the passive state 920, passively recording all detected security violations (spurious and/or interference events), and conditionally detaching itself when certain satisfactory conditions are met. For example, a transition from the passive state 920 to the detach state 930 can occur when an internal error occurs. An internal error can occur if there is an application crash or bugs in the protective software, for instance. Also, a transition from the learn/remediate state 910 to the detach state 930 can occur when the security violations exceed a threshold. That is, since the staging mode runs in the detect/passive mode, sometime the number of distinct spurious events (e.g., JAVA/.NET spurious events) can become large, hence a threshold limit can be implemented. This allows the protected application to run gracefully to the extent possible.

Upon completion of the test setup, the results are then passed to a remediator engine for further processing, at step 820. The remediator engine analyzes and correlates the observed security violations, and performs a remediation by applying appropriate security exemption policies, at step 830. As a result, certain processes/DLLs can now run in a less secure or unprotected mode, as discussed further below. This process is repeated and, upon continued satisfactory results, e.g., no new security violations detected, the new applications can be put in production mode safely, at step 840.

8. Classes of Bad Properties

This section describes four commonly found bad properties exhibited by benign programs that often lead to spurious violations or interfere with the protective software runtime, typically leading to a loss of application functionality or a crash. The classes, each discussed below in further detail, include:

a) Unknown entity with bad properties;
b) Modifying existing code in a bad way;
c) Remote allocation/execution with bad properties; and
d) Hook address conflicts.

8.1 Unknown Entity with Bad Properties

In this first class of bad properties exhibited by benign programs, a new unknown entity, e.g., an application or DLL, can cause issues for the protective software if the entity's code is poorly behaved. This often results in undesirable spurious violations. If the entity is on the BlackList, the appropriate "action" attribute attached to it determines whether it should be "denied" or "detached". Otherwise, the default action under "HA-c" mode is to "detach" first and then "deny", if the former fails for some reason. If the entity is on the GrayList (e.g., a new unknown), the protective software addresses any spurious violations generated from it by entering into passive state for a short window, under the assumption that an attack is unlikely within that small window relative to the risk of a spurious violation, and that a representative set of spurious violations will be captured within the window to avoid future spurious violations.

The detection component 145 may be used by the protective software to determine when this type of bad property is present based on the following.

a) The WhiteList information is stored in a file pointed to by an option or registry key. The current version lists all entities (e.g., DLLs/processes) internally qualified by QA and includes timestamp, checksum, portable executable (PE)-name, image-size and action information.
b) When an entity not on the WhiteList, LightGrayList or ExemptGrayList is loaded, an event is generated.
c) The protective software then enters into the passive state using one of the window expiration heuristics (see previous section for details). For entities loaded before the protective software is injected into the protected application, time starts when the protective software initializes.
d) In the passive state, the protective software records all spurious events generated by this entity. If a spurious event is detected, the protective software analyzes the cause. In this case, it will most probably be a source and/or target (option controlled) which is a GrayList DLL. The protective software then attempts to apply the appropriate remediation (see section 11), records the transition and updates the ExemptGrayList set.

8.2 Modify Existing Code in a Bad Way

In this second class of bad properties exhibited by benign programs, when a new DLL is introduced into a protected application, it may modify existing code in the process in a way (e.g., via hooking with trampolines) that causes problems for the protective software (e.g., namely false positives, typically from memory permission changes/code modifications or unexpected DGC (from trampoline targets)).

A detection component may be used by the protective software to determine when this type of bad property is present, analogous to the above section regarding unknown entities with bad properties, except that the protective software enters into the passive state process-wide instead of just for spurious events emanating with a target/source inside an unknown DLL (thus opening a larger security hole, but covering more cases including a more reliable DGC detection). Reporting may be complicated by not knowing which DLL to attribute the fault to, but the exemption will be applied process-wide.

8.3 Remote Allocation/Execution with Bad Properties

In this third class of bad properties exhibited by benign programs, another interoperability issue arises when code is directly written into a process (by a remote write) and later executed. This has been seen in cases where a small stub is written into a process (targeted by a new thread created by the injector process) to load a DLL that does the actual work (though one can also imagine directly introducing hooks this way, etc.).

A detection component may be used by the protective software to determine when this type of bad property is present. In this case, the protective software keeps track of pending start addresses for in-process created threads. It then identifies remote threads by comparing the address targeted by the new thread not on the list. The remote threads are handled slightly differently by the protective software. For example, they can be tagged differently by the protective software than the threads that get created after the protective software is injected into the protected process.

8.4 Hook Address Conflicts

In this fourth class of bad properties exhibited by benign programs, hook address conflicts refer to problems that arise when the application (typically security products via injected DLLs) and the protective software both want to hook the same function by patching the function entry point. This can have bizarre effects on the normal operation of both the application and the protective software. Hook conflicts can be broadly separated into two categories: the protective software hooks first, or the application hooks first.

9. Relaxation in Security

Once the spurious event(s) and the suspect bad property are identified by a detection phase, an appropriate exemption in the security policies can be applied to the entity by the remediation phase. The suspect bad property refers to one of the four bad properties mentioned above. Each of these properties mandates subtle relaxation policies. This section discusses various remediation handles that get applied by 0-touch and 1-touch mechanisms to address the various classes of bad properties detected.

9.1 0-touch Security Policy Relaxation

This section describes the various remediation, e.g., relaxation, policies that the protective software can apply in an automatic way without requiring human intervention. For each of the four classes of bad properties described in the earlier section, the appropriate exemption policy is chosen.

9.1.1 Unknown Entity with Bad Properties

The remediation is initially applied to a suspect page boundary which is identified to be the source for generating the spurious event(s). This usually refers to an offending code snippet, or permission violations that are noticed at this page boundary. An appropriate remediation is described below. The remediation further extends to include the entire section of the DLL (if for some reason the former is not satisfactory) or even the entire DLL. The remediation component includes:
a) Heap violations. Add the target page to the future executable list (thus allowing execution from it until de-allocated); and
b) RCT violations. Add the target address to the appropriate RCT exemption table, and extend to exempting DLL (as source, target, or both) from classes of RCT checks

9.1.2 Modify Existing Code in a Bad Way

The remediation component is similar to the one for the above section 9.1.1.

9.1.3 Remote Allocation/Execution with Bad Properties

The detection phase allows the protective software to precisely identify all remotely injected threads. If any of these threads results in spurious events while the protective software is in the passive state, the protective software makes the necessary adjustments. A heuristic which can be employed is to relax code origin checks for just the first page targeted by the remote thread.

9.1.4 Hook Conflict Improvements

A hook can be a location in a compiled program, such as a protective application or DLL, for instance, where an instruction is inserted to interrupt (or redirect) the original program flow to now target a hook address. This is a common technique employed by vendors to patch open APIs to perform vendor-specific tasks. A hook address conflict can occur when two or more hooks attempt to call the same function. The protective software can use four methods to resolve hook address conflicts: (1) Hook Chaining, (2) Hook Deeper, (3) Hook Emulation and (4) Hook Squashing.

9.1.4.1 Hook Chaining

This first heuristic attempts to chain the two conflicting hooks in a manner so that each can interoperate better without losing any transparency. Two possible scenarios can arise: application hooks first, or the protective software hooks first.

In the application hooks first case, the protective software replaces the hook with its own hook, and modifies the return path of its own hook to go to the application hook. However, a complication sometimes arises in that, for some hooks, the protective software needs to additionally see the application state after several instructions past the hook are executed (certain Windows NT® system call wrapper hooks return point). Sometimes there is not enough space to place a hook, in which case extra memory can be made available by copying the next few instructions after the hook point (relocating/mangling, e.g., readjusting the branch offsets to target the new hook, as necessary) to the hook target buffer and executing the instructions from there. A hook is inserted to return from the hook buffer to its original point. Occasionally, this does not work with hook chaining, as the application hook expects to see the application state prior to those few instructions. In that case, the protective software can move into an interpretation mode. The protective software replaces the hook with its own hook and then interpret(s)/emulate(s) the application hook (via a software code cache) until the desired hook point(s) are reached. Nevertheless, if the application later removes its hook, the protective software needs to detect it (via write fault and keeping the memory read-only) and patch up its trampoline buffer appropriately.

When the protective software hooks first, chaining can be difficult. The burden is on the application to behave transparently at the point. Some applications give up if they detect that the function is already hooked with some loss of functionality. Some applications will replace the hook, but not properly relocate the existing hook, leading to a crash. This also makes it impossible for the protective software to remove its own hook (say on a detach). Other options, listed below, can then be investigated.

9.1.4.2 Hook Deeper

This second heuristic attempts to hook deeper into the target function so that there is no address conflict as a result of the change. This makes the assumption that the application hook returns to the next instruction boundary (or an instruction boundary before the protective software inserted hook). The protective software makes the necessary code and branch adjustments so that the original application functionality is not lost. This technique is used in an application-hooks-first scenario (by detecting the offending hook and moving the interception point deeper); or in a protective software-hooks-first scenario (by pre-emptively hooking deeper into the function on the expectation that most applications will hook at the function entry point).

9.1.4.3 Hook Emulation

This third heuristic involves emulating all reads and writes to hooked regions. The protective software makes a shadow copy of the hooked page(s) and makes the pages unreadable. It then uses the shadow copy for building its software cache. All future reads/writes to those pages by the application will fault, allowing the protective software to emulate them using the shadow copy. As the reads, writes, and transfers (if native) happen, they can be modified to reference the shadow copy if the operation is not targeting the hook region (just the same page), thereby ameliorating the performance impact. This is transparent to the application, for the most part, but potentially quite expensive performance-wise, and pretty invasive. One limitation is that the protective software can not hook any region on the same page as the user exception dispatcher entry point, and without a kernel component, it can not reduce the cost of faults from pages directly targeted by the kernel. This limitation does not allow the protective software to apply emulation on pages that have Ki (kernel) routines on them.

9.1.4.4 Hook Squashing

This fourth heuristic involves squashing the hook attempt by the application in an attempt to make the suspect application available. This can sometimes result in loss of application functionality. In an application-hooks-first scenario, this entails the protective software overwriting the application hook with its own hook. In a protective software-hooks-first scenario, this involves preventing writes to the hook region. The protective software marks the hook region as non-writable, prevents any future changes to the protection of the hook region, emulates future writes to the same page as the hook region using emulation technique, and squashes any write-faults to the hook region.

9.1.5 Miscellaneous Other System-wide Relaxations

In addition to the above four common classes of bad properties, the protective software can provide various other system-wide relaxations to address spurious events generated from DGC.

The protective software can further keep track of which application memory regions are represented in the code cache in order to keep the cache consistent with application memory. For correctness, the protective software follows one guiding principle: Every application region that is represented in the code cache must be either read-only or have its code cache fragments sandboxed to check for modifications, to avoid executing stale code.

The protective software keeps an executable list of all memory regions that meet the principle, e.g., have been marked read-only or sandboxed. This list is initially populated with the entire memory regions marked executable but not writable at the point at which the protective software takes control. The list is updated as regions are allocated and de-allocated through system calls.

When a read-only region is written to, the protective software traps the fault, flushes the code for that region from the code cache, removes the region from the executable list, and then re-executes the faulting write. When a sandboxed fragment detects that its corresponding application code has changed, it removes only itself from the cache. Note that there is a sizable space penalty for sandboxed fragments, as they store a copy of the original application code (hashes are not good enough here they increase uncertainty). Additionally, the sandboxed fragments contain a lot of code at the beginning and after each write. Fortunately, they are only needed for truly self-modifying code, where the writer and the target are on the same page or possibly multiple pages if the instructions span page boundaries, and on Windows®, for code on the stack, because Windows® does not allow an alternate exception handling stack, a read-only stack means no exception handlers can execute, so the process is silently killed.

Such an approach may be needed for processors, such as the Intel® IA-32 processors, which keep the instruction cache consistent with the data cache in hardware. Advantageously, no explicit instruction cache flush is required. Software does not need to explicitly flush the instruction cache in order to populate it with recently written data. This is in contrast to most other architectures, where an explicit flush instruction can be used by systems such as provided herein to detect when code is being modified.

The protective software philosophy is to support the most common and stylized uses of DGC. All DGC sequences that are explicitly marked as code by the application by either marking its pages as executable (X) or by using the NtFlushInstructionCache system call are supported. In Microsoft Windows®, the NtFlushInstructionCache system call forces a cache refresh on the memory block containing the IAT.

Based on the above guiding principles, specific remediation policies for 0-touch security policy relaxation can be provided based on the following:

1. executable_after_load

If a module needs to be rebound or relocated, the Windows® loader marks its IAT or the entire text section as RW (read-write), performs its work, and then marks it back as X (executable) or RX (read-executable). The normal behavior is for the protective software to remove the region from the executable list on the RW modification. The protective software then sees a data region being marked as X and flags a security violation. This policy says to allow that mark as X, but only if the target region is in a module currently being initialized by the loader.

To determine whether the region is in a module, or what the loader is doing, first, the allocation base for the region is obtained, which for a module always points to the module base. A check is made to determine if that base looks like a portable executable (PE) header, and whether the full header is readable. If so, the sections are walked and checked to determine whether the region being marked X is inside a section marked as code (there can be multiple code sections: .text, .orpc, or object remote procedure call, and potentially others). One approach is to require the region to match a code section exactly (start to end) or to match an IAT that is inside a code section.

Once the PE code section test passes, the loader lock is checked. If it is held by the current thread, the loader module list is walked to determine if the region's owning module is being initialized: if its count is 0, or it has a certain "I'm being initialized" flag set. On Windows®2003, the count can reach 1 before full initialization. If not, we still allow it if it is an IAT being marked executable, as we have seen the loader (at least on Windows® 2003) patch the IAT after a module is marked initialized. Since the IAT does not contain code, we are not worried about this as a security hole.

For Windows® 2003, the loader does not hold the loader lock prior to the image entry point, and, in fact, there are Microsoft® services that create threads prior to that point, and the loader continues to access its data structures with no synchronization. In this case, the protective software allows the mark as X on Windows® 2003 up until image entry.

Note that we do not allow a region that was not allocated as executable to be later marked as executable, except during loader initialization. If an application wants a data region to contain code, it needs to allocate that region on the heap and mark it executable on allocation (see the next policy). Thus, code in data sections of DLLs is not supported; unless they are trampolines (see executable_if_trampoline). But, any memory can contain code if the flush routine is called on it (see executable_if_flush).

2. executable_if_rx_text

This policy allows execution from any portion of a module text section marked RX (readable-executable).

3. executable_if_alloc

When we encounter a region being allocated that is marked writable and executable (WX), we place it on a future executable list. This list is persistent until the region is de-allocated, so the application can write to the region later, and it can come on and off the executable list (which is required to handle the repeated write-execute behavior of these applications). The exception is if the region is on the stack, in which case the region is removed from the future executable list once it is executed and added the executable list. If it is later written to (for Windows®, that means a self-modification write in a fragment), the region is flushed and removed from the executable list. No security violation is flagged on the write, because the application could simply be finished with executing the region and it is now being used as a normal stack. Additionally, our philosophy in general is to flag errors on execution, not on data writes, which can be inconclusive.

This policy can be restricted further on Windows® 2003 due to the executable heap feature that it provides, as follows:

a) For mmap (the mmap( ) function establishes a mapping between a processes' address space and a file or shared memory object):
  i) For an image, sections mapped in at any time as RWX are put on the future list.
  ii) Non-images never have executable regions added to the future list.

b) For allocation:
   i) Nothing allocated before we're initialized is allowed on the future list.
   ii) Later allocations are only put on the future list if they are committed as RWX without a prior reservation. This eliminates the heap, which is reserved in a big chunk and then committed piecemeal.

4. executable_if_flush

This policy is very similar to executable_if_alloc, except it adds a region to the future list when it has NtFlushInstructionCache called on it. The bounds from the flush call, not the entire region, are used. Fortunately, these flush calls use small (sub-page, even) granularity regions. However, because we can only make regions at page boundaries un-writable, we expand the flush region to page boundaries.

5. executable_if_hook

This policy targets an application modifying code to insert hooks. Applications will mark a sub-page of a DLL as writable, insert a hook, and then mark it read-only. Unfortunately, even if the application uses the NtFlushInstructionCache call (see executable_if_flush), only the sub-page will be added to the future list, while the entire page will be removed from the executable list upon the call marking part of it as writable. Furthermore, in some cases code on the same page will be executed prior to the completion of hook insertion, often because the application call to VirtualProtect is on the same page, or the hook target is in kernel32 on the same page as VirtualProtect. The VirtualProtect function changes the protection on a region of committed pages in the virtual address space of the calling process. Kernel32.dll is the 32-it dynamic link library found in the Windows® operating system kernel. It handles memory management, input/output operations, and interrupts.

This policy places a region changed to RWX on the future list, but it will be removed the first time it is accessed there. The idea is that, if alternating writes and executes occur, they must mean that the patching/hooking code happens to be on the same page as the target. In that case, self-modifying code sandboxing will set in, and the region will stay on the executable list. To handle the case of execution on the target page occurring before the write, we delay removing the RX->RWX region from the executable list until it is actually written to. This allows the application to hook kernel32 functions on the same page as VirtualProtect.

6. executable_if_trampoline

With this policy, code that does not pass the other policies is allowed to execute if it matches certain hard coded patterns. Four patterns which may be used are provided below.

6.1 A nested function "closure" trampoline that consists of two and only two instructions:
a) mov $immed->0x4(% esp)
b) jmp known-non-DGC-address
or
a) mov $immed->% ecx
b) jmp known-non-DGC-address Closure trampolines are allowed to be on the stack or the heap, and we require that the source instruction targeting the trampoline be a call. We also require that the immediate, e.g., a terminology in the instruction set which refers to a constant value, be an address (well, greater than 0×1000).

6.2 An exception handling trampoline that consists of two and only two instructions:
   i) mov $immed->% eax
   ii) jmp known-non-DGC-address This can only be on the heap, the immediate must be a non-address (less than 0×1000), and we require that the source instruction targeting the trampoline be a call.

6.3 A dynamic linking-type trampoline that consists of two and only two instructions:
   i) push $this-instr-address
   ii) jmp known-non-DGC-address This can only be on the heap.

6.4 A single return instruction that is on the stack but is less than the current stack pointer. On most operating systems, this would not be allowed, since the thread could be preempted and have a signal handler execute on its stack, clobbering anything beyond top-of-stack. This return instruction varies in its immediate operand, which leads us to assume that this is used to handle variable arguments for a stdcall (callee cleans up arguments) function. Instead of using an indirect jump, a dynamically generated return instruction is used. This can be restricted further by not linking it and verifying that its target is non-DGC every time. We could also allow it to be executed only once.

All of the four above-mentioned patterns for the executable_if_trampoline remediation policy are sandboxed, even if on the heap. There is no reason to write-protect the entire page, as there is usually data on the page as well and this is the only piece of code, and it is rarely executed.

Accordingly, the above provides various remediation policies that the protective software can apply in an automatic way without requiring human intervention, in a 0-touch technique.

9.2 1-touch Security Policy Relaxation

This phase, which relates to the staging mode, provides relaxation of security policies that can range from very specific exemptions to a broader security relaxation. Since this methodology requires human intervention and provides an ability to process all the detected spurious events in advance, it allows the protective software to analyze the bad properties more thoroughly and present a precise remediation policy. This luxury is not always available to the 0-touch mechanism, in which the protective software has to make an allow/deny decision quickly with only partial information.

Two major types of security relaxation settings, MEDIUM and LOW, can be provided in one possible approach. Various other approaches will be apparent to those skilled in the art. An appropriate security policy is chosen based on the pervasiveness and the severity of the violation event(s). MEDIUM security refers to a remediation policy (or policies) that apply to the offending source (or target) object, such as a DLL, a page, or section with certain allowable attributes, etc.

MEDIUM relaxation policies can include:
a) Exempt specific DLLs generating STACK violations.
b) Exempt specific DLLs generating HEAP violations.
c) Exempt specific DLLs generating Restricted Control Transfer (RCT) violations.
d) Allow execution from specific allowable sections of a specific DLL, e.g., TEXT, DATA, IMAGE.
e) Allow execution from pages with specific allowable properties, e.g., marked X, RX.

LOW relaxation policies can include:
a) Exempt all STACK violations.
b) Exempt all HEAP violations.
c) Exempt all RCT violations.

The algorithm provided in Table 1 outlines the order in which the exemption rules can be applied depending on the type and origin of the security violation. Each exemption policy is designed such that its invocation does not have any reverse side-effects on the normal running state of the program.

and implement a remediation policy around it. The LOW category results in exempting all violations in the respective category.

TABLE 1

HEAP violations

| MEDIUM security | LOW security |
|---|---|
| If (TARGET in TEXT section) {<br>   First violation: Mark TARGET module's TEXT section as executable<br>   $2^{nd}$+: Mark the entire TEXT section as executable<br>}<br>else if (TARGET in DATA section) {<br>   if (TARGET in PAGE marked 'X') {<br>      First violation: Allow execution from all pages (marked 'X')<br>                   in DATA section within TARGET module<br>      $2^{nd}$+: Allow execution from all pages (marked 'X') in DATA section<br>   }<br>}<br>else {<br>   if (TARGET in IMAGE section and module is valid name) {<br>      Mark TARGET module's IMAGE section as executable<br>   }<br>   if (PAGE is marked 'RX') {<br>      Allow execution from all pages marked 'RX'<br>   }<br>   else if (PAGE is marked 'X') {<br>      Allow execution from all pages marked 'X"<br>   }<br>   if (TARGET in IMAGE section) {<br>      Mark rest of the IMAGE section as executable<br>   }<br>   else {<br>      Turn OFF all HEAP violations emanating from SOURCE module<br>   }<br>} | Turn OFF all HEAP |

Referring to Table 1, relaxation for HEAP violations starts by identifying the offending target address and the section (TEXT, DATA, IMAGE) that it belongs to. This helps in providing a policy to exempt all violations originating from the specific section. Another option is to find the properties of the PAGE (R, X, RX) that the target address belongs to, and identify a remediation policy around it. Another option in the MEDIUM category is to exempt all violations emanating from the source module. The LOW category results in exempting all HEAP violations. This is a very broad relaxation policy and typically will be rarely used.

TABLE 2

| RCT Violations | STACK Violations |
|---|---|
| MEDIUM security | MEDIUM security |
| if (TARGET is a MODULE) {<br>   Exempt RCT violations targeting<br>   TARGET MODULE)<br>}<br>else if (SOURCE is a MODULE) {<br>   Exempt RCT violations emanating from<br>   SOURCE MODULE<br>} | Exempt STACK violations emanating from SOURCE MODULE |
| LOW security | LOW security |
| Exempt all RCT violations | Exempt all STACK violations for the given process |

Referring to Table 2, the RCT and STACK violations behave similarly. One option in the MEDIUM category is to first identify the offending TARGET or SOURCE module 9.3 Detection of Spurious Events at System Level Sometimes, the spurious events behave in a complex manner such that it becomes hard to identify a single point-of-failure or reason generating it. We have identified mainly two broad classes of bad properties that result in generation of spurious events that need to be analyzed at the system (or global) level, namely spurious events due to DGC and spurious events due to interoperability, discussed below.

9.3.1 Spurious Events Due to DGC

Due to the nature of dynamically generated code, several spurious events can be generated, often with different target addresses. One approach is to define heuristics that precisely relate several such DGC spurious events to a common offending DGC property, hence a common relaxation policy. If the protective software does not support graceful execution of dynamic code sequences, one solution is to allow native execution of the DLL generating/modifying such DGC sequences.

The two heuristics used to identify DGC events are shown in Table 3 and Table 4. The first heuristic identifies DGC events within a module, while the second heuristic catches DGC events across modules by matching the memory allocation bases of the SOURCE and TARGET HEAP region where the violation is detected. All such unique SOURCES detected are added to the native execution list. This informs the protective software to detach and allow native execution of the matched DLL from the list.

9.3.2 Spurious Events Due to Interoperability

Most (if not all) interoperability issues result in the generation of system-wide spurious events. Two heuristics are used to detect such scenarios. The first heuristic identifies an interoperability problem if the same security violation (as indicated by a common Threat-ID) happens in a predetermined number, e.g., five (or more), processes. The second heuristic identifies an interoperability problem if a security violation is detected with the TARGET one of the supported applications.

into the production mode. At step 1000, a flag is set to indicate that injecting protective software into at least one process of protected software is allowed (RUNUNDER_ON=allow injecting). At step 1010, a first instantiation of the at least one process of protected software is detected. At decision step 1020, the flag is accessed to determine whether injecting of

TABLE 3

DGC Violations (I) Identification of DGC events within a Module
When five or more HEAP violations from the same process have the identical MEMORY_ALLOCATION_BASE, mark them as DGC. A suggested recommendation is:
PUT the UNION of SOURCES of the TRIGGERING DGC violations to NATIVE_EXECUTION_LIST.
(II) Identification of DGC events across Modules (Transitive Dependencies)
set S = set of SOURCES in the TRIGGERING violations set
for each s in S {
    if s is a NAMED DLL IMAGE, add its name to NATIVE_EXECUTION_LIST
if (MEMORY_ALLOCATION_BASE of s is a TARGET of a non-TRIGGERING violation
AND (SOURCE of that violation is not in S)) {
Add the SOURCE from that violation to S
    }
}
Identify all SOURCES in S and put them into the NATIVE_EXECUTION_LIST

TABLE 4

Interoperability Violations (I) Threat-ID conflict
When security violations with the same Threat-ID happen in five or more processes, for instance, treat the events as due to an Interoperability problem.
(II) Effect on Supported Applications
When a security violation has its TARGET in TEXT section and the process is a supported application (except w3wp.exe), treat the events as due to an Interoperability problem.

10. Availability of Programs when Boot Problems Detected

Some systems do not boot gracefully because of incompatibilities with processes protected under the protective software. A RUNUNDER_ONCE technique is proposed to mitigate such problems. The proposed solution provides a mechanism by which all such bad properties are detected gracefully while letting the application continue to run forward and boot gracefully. The proposed solution can be provided as a 1-touch solution. The details include:

1) RUNUNDER_ONCE functionality to mitigate boot problems. The steps include:

a) RUNUNDER_ONCE flag set the FIRST time.

b) When the protective software encounters this flag, it injects into the process (if a RUNUNDER_ON flag is set) after clearing the RUNUNDER_ON flag.

c) As a result, the protective software is guaranteed to inject into at most one instance of each process.

d) Next time the process is instantiated (not necessarily a second boot), the protective software will not be injected. In the case of boot failure this will be on the next reboot.

e) When the node manager gets a policy update (indicating a successful boot or a policy change) the RUNUNDER_ON flag is reset to ON.

f) If a relaxed security policy is chosen as a result of prior boot iterations, the application continues to run with the relaxed setting the next time (sometimes requiring several boot iterations to converge on required relaxation settings).

Figure 10:
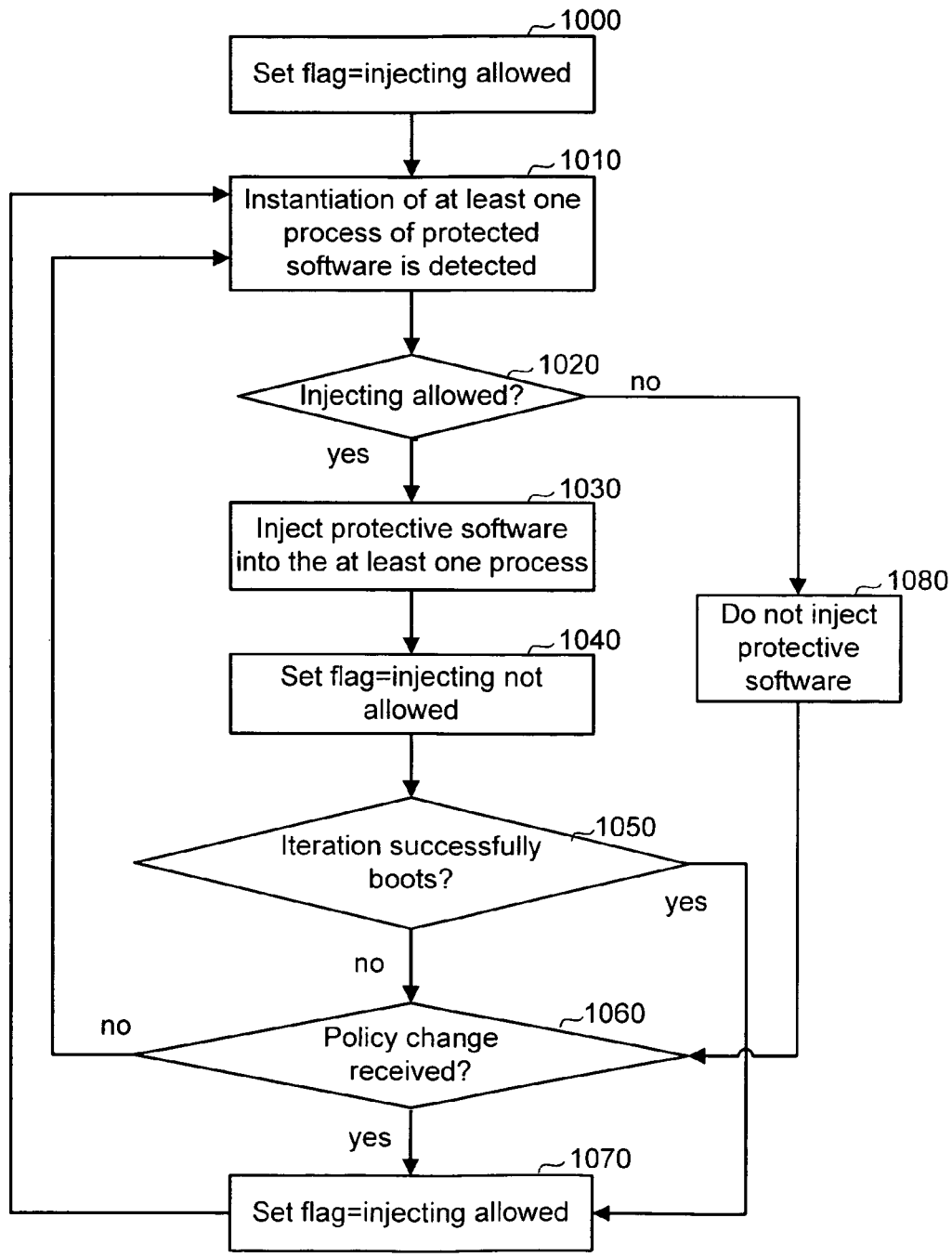
FIG. 10 depicts a process for mitigating boot problems in protected software.

An example mitigation process can be provided as indicated in FIG. 10. Note that the process may be used in the 1-touch, staging mode so that any problems which are detected can be fixed or remediated before the system is put the protective software into the at least one process is allowed. If the injecting is allowed, the protective software is injected into the instantiation of the at least one process, at step 1030, and the flag is set to not allow a repeat of the injecting, at step 1040. If the current iteration successfully boots, at decision step 1050, the flag is set to allow injecting again, at step 1070. One boot iteration can include several running processes operating at different RUNUNDER_ON flags, depending on whether or not prior boot iterations found any problems with those processes. If the current boot iteration is successful, all of the affected processes continue to run with the inherited flags from prior iterations (so far) until no further problems are noticed.

The flow continues at step 1010 when an instantiation of another process is detected. If the current iteration does not successfully boot, at decision step 1050, and a policy change is not received, at decision step 1060, a second instantiation of the at least one process may attempt to boot, for example, and be detected at step 1010. In this case, it will be seen that the inject flag has been set to prevent injecting, at step 1020, in which case the protective software is not injected into the second instantiation of the at least one process, at step 1080. Steps 1050 and 1060 may be combined into one decision step in which a policy update received by a node manager for the protective software is an indication of a successful boot. Otherwise, the boot is not successful.

11. Availability of Programs when Errors Detected

Under some rare scenarios, the protective software runtime can itself run into situations where continued protection is not possible. Typical server deployments mandate that the application never becomes unavailable due to the protective software protection. Two such situations that preclude further protection under the protective software include:

a) Out of Memory conditions; and b) Certain failures in the protective software runtime.

A small reserve memory can be maintained for use when Out-of-memory conditions are detected a little earlier using the call stack. The reserve memory is used to allow the protective software to gracefully detach from the running processes. Other options include:

a) Freeing up memory by decomitting any dead memory; and b) Flushing all (or part) of the code cache to free up memory in the hope of continuing with a smaller working set.

The protective software runtime failures are less obvious and can be approached by introducing some mechanisms of categorizing the origin conditions that cause the error to occur. Some examples indicate:

1) Internal to Protective Software (No Loss of Application State)

a) NULL pointer detected b) During fragment creation c) During branch table lookups d) Internal lock contentions e) Hash table initialize 2) External to Protective Software (Loss of Application State)

a) Private basic block cache has corrupted entry b) Race conditions c) Data structure corruptions The error conditions that result in no loss of application state are detached gracefully by using a proposed method of sanitizing the protective software code (wherever deemed necessary) into try-exception blocks, e.g., use a try {code} except {detach( );} clauses. Generally, sometimes undesirable crashes (or errors) are noticed in an attempt to put an application under protection. Some of the problems lie on the protective software side, and some on the protected software side. In the former case, the protected software can continue to be available by making certain adjustments to its protection profile. The pieces of code in the protective software which do the mentioned tasks are put under the try-exception clauses, which allow the protective software to detach itself automatically if such a situation arises. If successful, the application software can still continue to run native, i.e., without protection, and be available.

12. Blacklist Based Actions (Deny or Detach)

There are certain applications or DLLs that exhibit well defined bad properties that are known a priori and need to be denied from running. Examples include:

a) Malicious DLL Injectors; and b) Certain System-wide Hookers

There are also certain applications or DLLs that have benign dynamic properties that result in spurious events in the protective software. Examples include:

a) Dynamically Generated Code (DGC); and b) Benign Hookers.

The former, e.g., Malicious DLL Injectors and Certain System-wide Hookers, presents cases where the suspect application is denied from running in protective software. The latter, e.g., Dynamically Generated Code (DGC) and Benign Hookers, provides cases where the suspect application or DLL can be selectively detached from the protective software and run native without interrupting the original program state. The framework provides a methodology by which an appropriate blacklist action (deny or detach) can be selectively taken for the above two scenarios.

The present invention can be accomplished using hardware, software, or a combination of both hardware and software. The software used for the present invention can be stored on one or more processor readable storage media or devices including hard disk drives, CD-ROMs, DVDs, optical disks, floppy disks, tape drives, RAM, ROM or other suitable storage devices. The software can be used to program a computing system with one or more processors, storage elements in communication with the processor(s) and communication interfaces in communication with the processor(s). In alternative embodiments, some or all of the software can be replaced by dedicated hardware including custom integrated circuits, gate arrays, FPGAs, PLDs, and special purpose computers.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for protecting software, the method comprising:

executing protected software in a testing environment, the testing environment insulating the protected software from attacks;

running a protective software framework to monitor the protected software while the protected software executes in the testing environment, the protective software framework detecting spurious events, the spurious events being benign security events caused by the protected software while executing in the testing environment, a security event being a violation of a security policy, the benign security events being security events caused by the protected software when the protected software is operating as intended;

identifying a remediation for the security event, the remediation being a relaxation of the security policy;

maintaining information indicating an association between the security event and the remediation;

executing the protected software in a production environment in which the protected software is subject to attacks;

running the protective software framework to monitor the protected software while the protected software executes in the production environment, the protective software framework enforcing the security policy that is relaxed according to the remediation.

2. A method for protecting software, the method comprising:

executing the protected software on a computer;

running a protective software framework on the computer, the protective software framework monitoring the protected software while the protected software executes on the computer, the protective software framework enforcing a security policy;

detecting a security event by the protective software framework, the security event being a violation of the security policy;

classifying the security event as one of an attack and a spurious event, the spurious event being caused by benign behavior of the protected software;

when the security event is classified as a spurious event, accessing information which associates the spurious event with a remediation, and implementing the remediation for the security event, the remediation being a relaxation of the security policy.

3. The method of claim 2, wherein the information is based on testing of the protected software in a testing environment in which the protected software is insulated from attacks.

4. The method of claim 2, wherein:
the security event comprises a heap violation; and
the remediation comprises adding a target page to a future executable list.

5. The method of claim 2, wherein:
the security event comprises a restricted control transfer violation; and
the remediation comprises adding a target address to a restricted control transfer exemption table.

6. The method of claim 2, wherein:
the security event occurs when code is directly written into an application of the protected software by a remote thread and later executed; and
the remediation comprises relaxing code origin checks for a first page targeted by the remote thread.

7. The method of claim 2, wherein:
the security event occurs when there is a hook address conflict between conflicting hooks in the protected software and associated protective software; and
the remediation comprises chaining the conflicting hooks.

8. The method of claim 2, wherein:
security event occurs when there is a hook address conflict between conflicting hooks in the protected software and associated protective software; and
the remediation comprises hooking deeper into a target function of the conflicting hooks.

9. The method of claim 2, wherein:
the security event occurs when there is a hook address conflict between conflicting hooks in the protected software and associated protective software; and
the remediation comprises emulating reads and writes to hooked regions.

10. The method of claim 2, wherein:
the at least one security event occurs when there is a hook address conflict between conflicting hook attempts in the protected software and associated protective software; and
the remediation comprises squashing the hook attempt of the protected software.

11. The method of claim 2, wherein:
the security event occurs when a target data region of the protected software is marked as readable-writable, then marked as executable; and
the remediation comprises allowing the target data region to be marked as executable when the target data region is in a module which is being initialized by a loader.

12. The method of claim 2, wherein the remediation comprises allowing execution from any portion of a module text section of the protected software which is marked as readable-executable.

13. The method of claim 2, wherein the remediation comprises placing a data region of the protected software which is being allocated, and which is marked as writable-executable, on a future executable list.

14. The method of claim 2, wherein the remediation comprises placing a data region of the protected software which has a cache refresh call made on it, on a future executable list.

15. The method of claim 2, wherein the remediation comprises placing a data region of the protected software which is marked as readable-executable, then as readable-executable-writable, on a future executable list, and delaying removing the data region from the executable list until the data region is written to.

16. The method of claim 2, wherein the remediation comprises allowing code of the protected software to execute when it matches a hard coded pattern.

17. The method of claim 16, wherein the hard coded pattern comprises instructions of a nested function closure trampoline.

18. The method of claim 16, wherein the hard coded pattern comprises instructions of an exception handling trampoline.

19. The method of claim 16, wherein the hard coded pattern comprises instructions of a dynamic linking trampoline.

20. The method of claim 16, wherein the hard coded pattern comprises a single return instruction that is on a stack, but is less than a current stack pointer.

21. The method of claim 2, wherein the remediation comprises exempting specific DLL of the protected software which generates a stack violation.

22. The method of claim 2, wherein the remediation comprises exempting specific DLL of the protected software which generates a heap violation.

23. The method of claim 2, wherein the remediation comprises exempting specific DLL of the protected software which generates a restricted control transfer violation.

24. The method of claim 2, wherein the remediation comprises allowing execution from specific allowable sections of a specific DLL of the protected software.

25. The method of claim 2, wherein the remediation comprises allowing execution from pages of the protected software which have specific allowable properties.

26. The method of claim 2, wherein the remediation comprises exempting all stack violations.

27. The method of claim 2, wherein the remediation comprises exempting all heap violations.

28. The method of claim 2, wherein the remediation comprises exempting all restricted control transfer violations.

29. The method of claim 2, wherein:
a plurality of spurious events are caused by dynamically generated code; and
the remediation comprises applying a common security relaxation policy for the plurality of spurious events.

30. The method of claim 29, wherein the remediation comprises relating the plurality of spurious events to a common offending dynamically generated code property.

31. The method of claim 29, further comprising: applying a heuristic for identifying the plurality of spurious events caused by dynamically generated code within a module of the protected software.

32. The method of claim 29, further comprising: applying a heuristic for identifying the plurality of spurious events caused by dynamically generated code across multiple modules of the protected software.

33. The method of claim 2, wherein a plurality of spurious events are caused by an interoperability problem of the protected software with associated protective software.

34. The method of claim 33, further comprising: applying a heuristic for identifying the interoperability problem when a same security violation occurs in a predetermined number of processes of the protected software.

35. The method of claim 33, further comprising: applying a heuristic for identifying the interoperability problem when a same security violation is detected a predetermined number of times within a target application of the protected software.

36. The method of claim 2, further comprising: maintaining a reserve memory to allow the protective software framework to gracefully detach from the protected software when a main memory becomes full.

37. The method of claim 2, further comprising: handling a runtime failure of the protective software framework according to whether the failure is internal or external to the protective software framework.

38. A method for protecting software, the method comprising:
  executing protected software on a computer;
  running a protective software framework on the computer, the protective software framework monitoring the protected software while the protected software is executing on the computer, the protective software framework enforcing a security policy;
  detecting, by the protective software framework, a security event caused by the protected software, the security event being a violation of the security policy;
  determining whether the security event is a learned event or an unlearned event, a learned event being a security event that has previously been recorded by the protective software framework when the protective software framework ran in a passive state;
  allowing the protected software to continue running when the security event is determined to be a learned event; and
  killing at least one thread of the protected software which caused the security event when the security event is determined to be an unlearned event and the protective software framework is in an active state.

39. The method of claim 38, further comprising: allowing at least one thread of the protected software which did not cause the security event to continue running when the security event is determined to be an unlearned event.

40. The method of claim 38, wherein the determining as to whether the security event is a learned event or an unlearned event comprises accessing a record of learned events to determine if the security event is in the record.

41. A method for protecting software, the method comprising:
  executing protected software on a computer;
  running a protective software framework on the computer, the protective software framework monitoring the protected software while the protected software executes on the computer, the protective software framework enforcing a security policy;
  detecting at least one new application and/or DLL in the protected software as a result of the monitoring of the protected software by the protective software framework; and
  determining whether the at least one new application and/or DLL has been classified as: an entity which is known to be well-behaved, or an entity which is known to possess bad properties; otherwise, classifying the at least one new application and/or DLL as an unknown entity;
  wherein the classifying of the at least one new application and/or DLL as an unknown entity further comprises classifying the at least one new application and/or DLL as an entity which is observed by associated protective software to have bad properties which were remediated by a relaxation of the security policy; and
  allowing the at least one new application and/or DLL to execute when the at least one new application and/or DLL is determined to be an entity which is observed by the associated protective software to have bad properties which were remediated according to the relaxation of the security policy.

42. The method of claim 41, further comprising: allowing the at least one new application and/or DLL to execute when the at least one new application and/or DLL is determined to be an entity which is known to be well-behaved.

43. The method of claim 41, further comprising: denying the at least one new application and/or DLL from executing, at least in part, when the at least one new application and/or DLL is determined to be an entity which is known to possess bad properties.

44. The method of claim 41, wherein the classifying of the at least one new application and/or DLL as an unknown entity further comprises classifying the at least one new application and/or DLL as an entity which is observed by associated protective software to be well-behaved.

45. The method of claim 44, further comprising: allowing the at least one new application and/or DLL to execute when the at least one new application and/or DLL is determined to be an entity which is observed by the associated protective software to be well-behaved.

46. The method of claim 41, wherein the classifying of the at least one new application and/or DLL as an unknown entity further comprises classifying the at least one new application and/or DLL as an entity which is observed by associated protective software to have bad properties.

47. The method of claim 46, further comprising: denying the at least one new application and/or DLL from executing, at least in part, when the at least one new application and/or DLL is determined to be an entity which is observed by the associated protective software to have bad properties.

48. The method of claim 41, wherein the at least one new application and/or DLL has been classified as an entity which is known to have bad properties when it modifies existing code in the protected software in a bad way.

49. The method of claim 41, wherein the at least one new application and/or DLL has been classified as an entity which is known to have bad properties when code is directly written into the application by a remote thread and later executed.

50. The method of claim 41, wherein the at least one new application and/or DLL has been classified as an entity which is known to have bad properties when there is a hook address conflict between the at least one new application and/or DLL and associated protective software.

51. The method of claim 41, wherein the at least one new application and/or DLL has been classified as an entity which is known to have bad properties when it has an interoperability problem with associated protective software.

52. The method of claim 41, wherein the at least one new application and/or DLL has been classified as an entity which is known to have bad properties when it has an incompatibility problem with associated protective software.

53. The method of claim 41, wherein the at least one new application and/or DLL has been classified as an entity which is known to have bad properties when the DLL is associated with a malicious DLL injector.

54. The method of claim 41, wherein the at least one new application and/or DLL has been classified as an entity which is known to have bad properties when the DLL is associated with a specified system-wide hooker.

55. The method of claim 41, wherein the at least one new application and/or DLL has been classified as an entity which is known to be well-behaved when the at least one new application and/or DLL is associated with dynamically generated code.

56. The method of claim 41, wherein the at least one new application and/or DLL has been classified as an entity which is known to be well-behaved when the at least one new application and/or DLL is associated with a benign hooker.

57. A method for protecting software, comprising:
executing protected software on a computer;
running a protective software framework to monitor the protected software while the protected software executes on the computer, the protective software framework enforcing a security policy;
detecting, by the protective software framework, a security event caused by the protected software, the security event being a violation of the security policy;
determining whether the security event occurs within a defined time window;
when the security event occurs within the defined time window, treating the security event as a benign event wherein the protected software is allowed by the protective software framework to continue executing uninterrupted; and
when the security event occurs outside the defined time window, treating the security event as an attack wherein a thread of the protected software is killed by the protective software framework or an exception is thrown.

58. The method of claim 57, wherein:
the protected software comprises an application and a DLL; and
the defined time window begins when the DLL is first invoked by the application.

59. The method of claim 57, wherein:
the protected software comprises an application; and
the defined time window begins when the application is first detected by the protective software framework which performs the monitoring.

60. The method of claim 57, wherein:
the protected software comprises an application; and
the defined time window begins when the application is booted.

61. The method of claim 57, wherein the defined time window is defined by a clock time.

62. The method of claim 57, wherein:
the protected software comprises an application; and
the defined time window is defined by a predefined amount of CPU time used by the application.

63. The method of claim 57, wherein the defined time window is defined by a predefined code coverage metric.

64. The method of claim 57, wherein the defined time window is defined by a predefined number of event measurements.

65. The method of claim 57, wherein:
the protected software comprises an application and a DLL; and
the defined time window is defined by a time at which at least one of the application and the DLL reaches a stable state after boot up.

66. Storage medium for protecting software, the storage medium having a protective software framework embodied on the storage medium, the protective software framework comprising processor readable code that when executed causes a computer to perform a method, the method comprising:
monitoring protected software while the protected software executes on the computer, the protective software framework enforcing a security policy;
detecting a security event caused by the protected software the security event being a violation of the security policy;
classifying the security event as one of an attack and a spurious event, the spurious event being a benign behavior of the protected software;
when the security event is classified as a spurious event, accessing information which associates the spurious event with a remediation, and implementing the remediation for the security event, the remediation being a relaxation of the security policy.

67. The storage medium of claim 66, wherein the information is based on testing of the protected software in a testing environment in which the protected software is insulated from attacks.

68. Storage medium for protecting software, the storage medium having a protective software framework embodied on the storage medium, the protective software framework comprising processor readable code that when executed causes a computer to perform a method, the method comprising:
monitoring protected software while the protected software executes on the computer, the protective software framework enforcing a security policy;
detecting at least one new application and/or DLL in the protected software as a result of the monitoring of the protected software by the protective software framework;
determining whether the at least one new application and/or DLL has been classified as: an entity which is known to be well-behaved, or an entity which is known to possess bad properties; otherwise, classifying the at least one new application and/or DLL as an unknown entity
wherein the classifying of the at least one new application and/or DLL as an unknown entity further comprises classifying the at least one new application and/or DLL as an entity which is observed by associated protective software to have bad properties which were remediated by a relaxation of the security policy; and
allowing the at least one new application and/or DLL to execute when the at least one new application and/or DLL is determined to be an entity which is observed by the associated protective software to have bad properties which were remediated according to the relaxation of the security policy.

69. The storage medium of claim 68, wherein the method further comprises:
allowing the at least one new application and/or DLL to execute when the at least one new application and/or DLL is determined to be an entity which is known to be well-behaved.

70. The one or more processor readable storage devices storage medium of claim 68, wherein the method further comprises:
denying the at least one new application and/or DLL from executing, at least in part, when the at least one new application and/or DLL is determined to be an entity which is known to possess bad properties.

71. The storage medium of claim 68, wherein the classifying of the at least one new application and/or DLL as an unknown entity further comprises classifying the at least one new application and/or DLL as an entity which is observed by associated protective software to be well-behaved.

72. The storage medium of claim 68, wherein the classifying of the at least one new application and/or DLL as an unknown entity further comprises classifying the at least one new application and/or DLL as an entity which is observed by associated protective software to have bad properties.

73. Storage medium for protecting software, the storage medium having a protective software framework embodied on the storage medium, the protective software framework comprising processor readable code that when executed causes a computer to perform a method, the method comprising:

monitoring protected software, the monitoring comprises enforcing a security policy;

detecting a security event caused by the protected software, the security event being a violation of the security policy;

determining whether the security event occurs within a defined time window;

when the security event occurs within the defined time window, treating the security event as a benign event wherein the protected software is allowed by the protective software framework to continue executing uninterrupted; and when the security event occurs outside the defined time window, treating the security event as an attack whereby a thread of the protected software is killed by the protective software framework or an exception is thrown.

74. The storage medium of claim 73, wherein:

the protected software comprises an application and a DLL; and the defined time window begins when the DLL is first invoked by the application.

75. The storage medium of claim 73, wherein:

the protected software comprises an application; and the defined time window begins when the application is first detected by the protective software framework which performs the monitoring.

* * * * *